United States Patent
Miyazaki

(10) Patent No.: US 9,647,789 B2
(45) Date of Patent: May 9, 2017

(54) OPTICAL TRANSMISSION DEVICE, OPTICAL TRANSMISSION SYSTEM, AND TEST METHOD FOR ALARM FUNCTION

(71) Applicant: FUJITSU LIMITED, Kawasaki-shi, Kanagawa (JP)

(72) Inventor: Satoshi Miyazaki, Sapporo (JP)

(73) Assignee: FUJITSU LIMITED, Kawasaki (JP)

(*) Notice: Subject to any disclaimer, the term of this patent is extended or adjusted under 35 U.S.C. 154(b) by 10 days.

(21) Appl. No.: 14/264,582

(22) Filed: Apr. 29, 2014

(65) Prior Publication Data
US 2014/0355981 A1 Dec. 4, 2014

(30) Foreign Application Priority Data
Jun. 3, 2013 (JP) ................ 2013-117306

(51) Int. Cl.
*H04B 10/04* (2006.01)
*H04J 14/02* (2006.01)

(52) U.S. Cl.
CPC ........ *H04J 14/021* (2013.01); *H04J 14/0221* (2013.01); *H04J 14/0267* (2013.01)

(58) Field of Classification Search
CPC .. H04B 10/564; H04B 10/0795; H04B 10/07; H04B 10/07955; H04J 14/0221; H04J 14/0212; H04J 14/0217; H04J 14/0204; H04J 14/0205; H04J 14/021; H04J 14/0267; G02B 6/29395; G02B 27/1006; G02B 27/10
USPC ...... 398/38, 32, 33, 45, 82, 83, 93, 94, 197, 398/195, 192, 162, 158
See application file for complete search history.

(56) References Cited

U.S. PATENT DOCUMENTS

| | | | | |
|---|---|---|---|---|
| 5,875,054 A | * | 2/1999 | Onoda | H04B 10/2972 359/337 |
| 5,894,362 A | * | 4/1999 | Onaka | H04B 10/077 398/34 |
| 7,236,704 B1 | * | 6/2007 | Cao | G02B 6/2931 398/83 |
| 7,899,334 B2 | * | 3/2011 | Zhong | H04J 14/0204 398/157 |
| 2002/0024692 A1 | * | 2/2002 | Saito | H04B 10/0799 398/33 |

(Continued)

FOREIGN PATENT DOCUMENTS

| | | | | |
|---|---|---|---|---|
| JP | 2000-89263 | | 3/2000 | |
| JP | 2006-310963 | | 11/2006 | |
| WO | WO2012/053320 | * | 4/2012 | ............ H01S 3/10 |

OTHER PUBLICATIONS

Shinlin Xiao et al., "Tunable Optical Splitter Technology", Proceedings of SPIE, vol. 4870, pp. 532-539, 2002.
(Continued)

*Primary Examiner* — Hibret Woldekidan
(74) *Attorney, Agent, or Firm* — Staas & Halsey LLP

(57) ABSTRACT

An optical transmission device includes a splitter configured to have at least a first port, a second port, and a third port that output branched input light, branching ratios of the first port and the second port being variable, and a controller configured to reduce an optical level of output light from the first port to be monitored and increase an optical level of output light from the second port according to the reduced optical level of output light from the first port by controlling the branching ratios.

1 Claim, 19 Drawing Sheets

(56) References Cited

U.S. PATENT DOCUMENTS

| | | | | |
|---|---|---|---|---|
| 2003/0156840 A1* | 8/2003 | Uchikata | ............. | H04J 14/0297 398/7 |
| 2004/0264977 A1* | 12/2004 | Yap | ........................... | G02F 2/02 398/161 |
| 2005/0031346 A1* | 2/2005 | Kakizaki | ................ | H04B 10/00 398/45 |
| 2006/0239684 A1* | 10/2006 | Oguma | ............... | H04J 14/0204 398/83 |
| 2010/0098409 A1* | 4/2010 | Saito | ................. | H04Q 11/0062 398/16 |
| 2013/0222890 A1* | 8/2013 | Sakauchi | ............. | H04B 10/291 359/337.11 |

OTHER PUBLICATIONS

Japanese Office Action dated Mar. 14, 2017 in corresponding Japanese Patent Application No. 2013-117306, 4 pages.

* cited by examiner

FIG. 4

| ALARM | OUTPUT CONDITION |
|---|---|
| INDWNa_0<br>INDWNb_0<br>INDWNb_3<br>INDWNd_3 | OPTICAL LEVEL < − 50 dBm |
| POSa_0<br>POSb_0 | OPTICAL LEVEL > − 2 dBm<br>− 50 dBm ≤ OPTICAL LEVEL < − 15 dBm |
| INDWNa_1<br>INDWNb_1<br>INDWNa_2<br>INDWNb_2 | OPTICAL LEVEL < − 30 dBm |
| POSa_1<br>POSb_1<br>POSa_2<br>POSb_2 | − 30 dBm ≤ OPTICAL LEVEL < − 10 dBm |

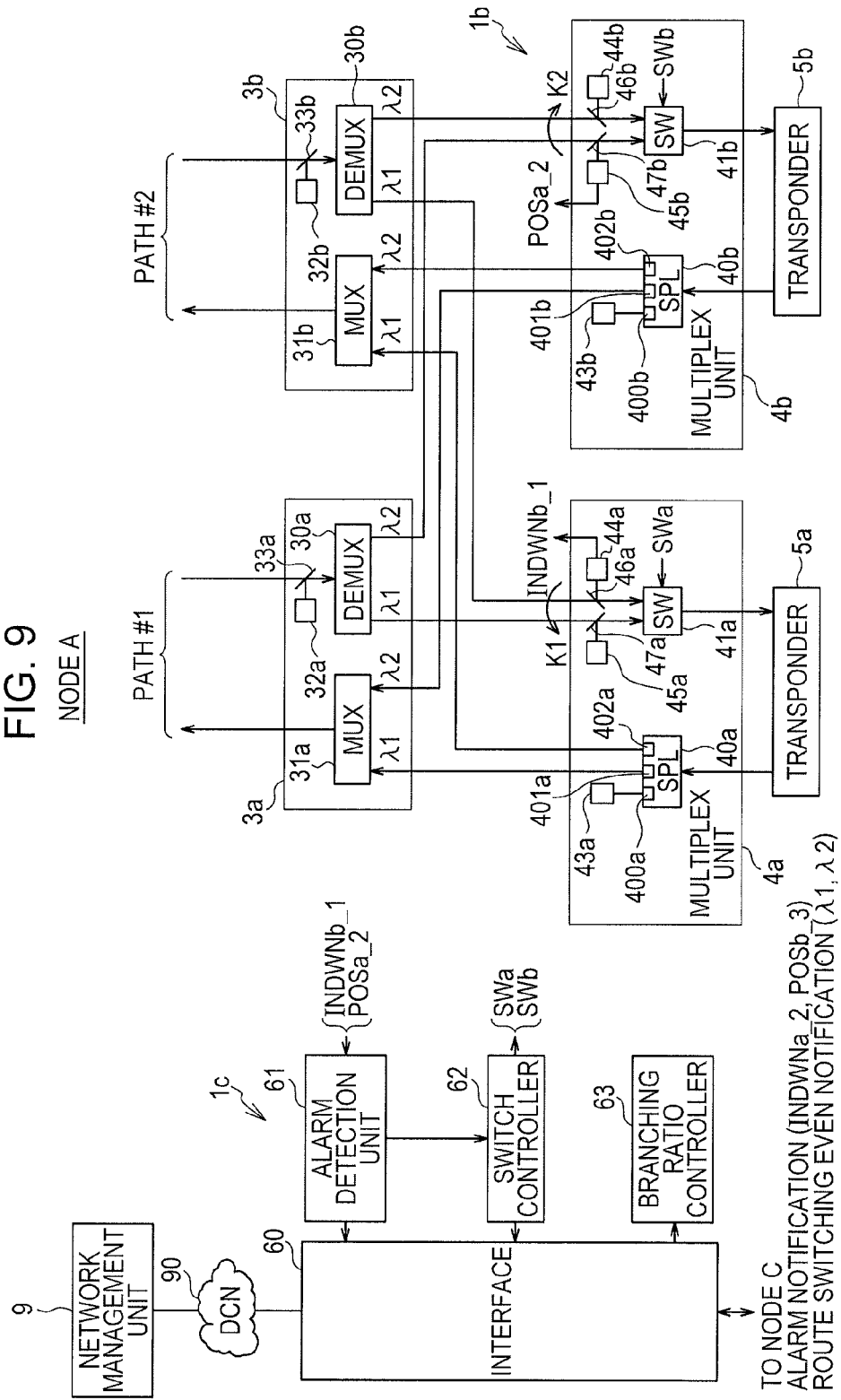

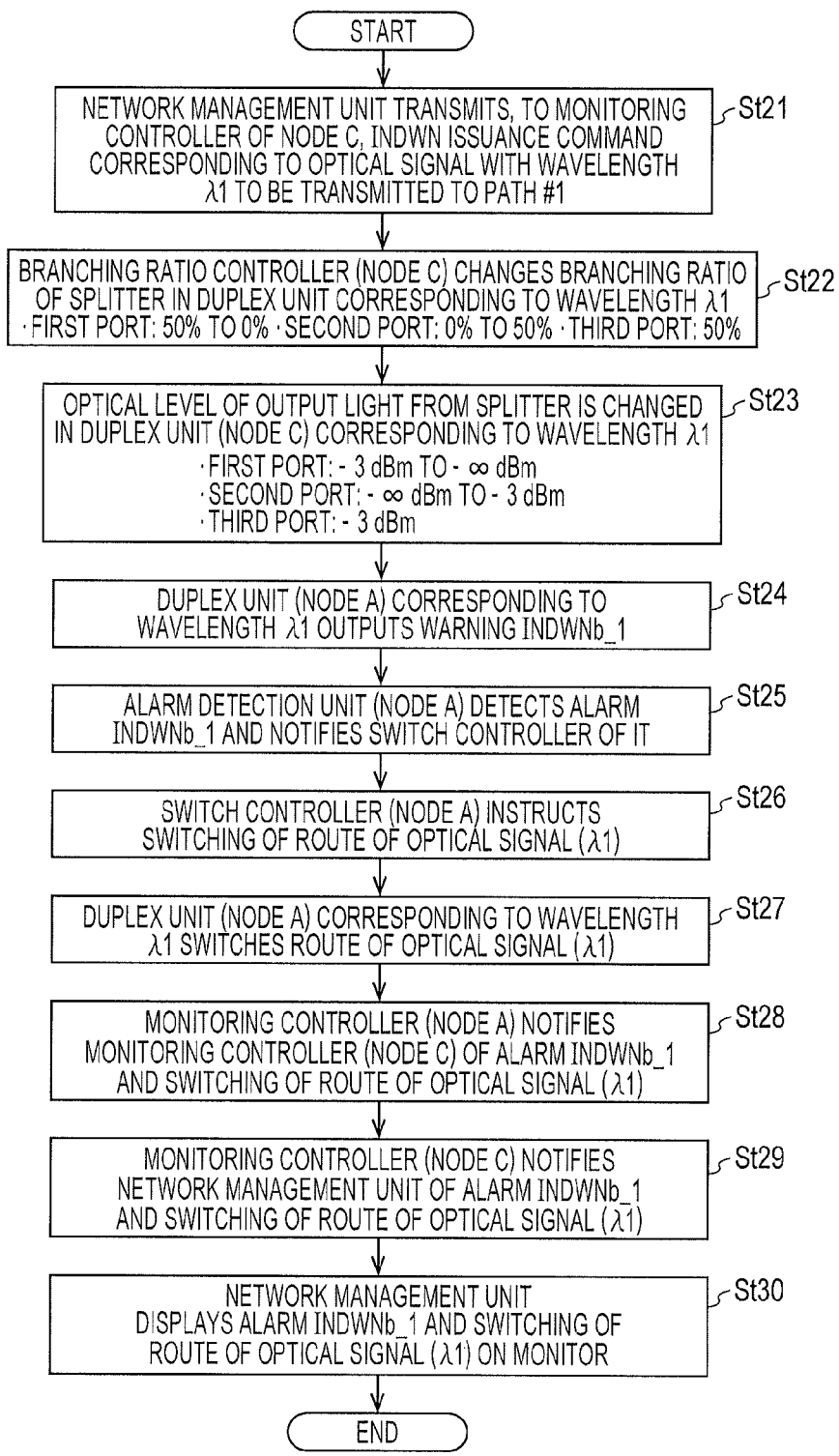

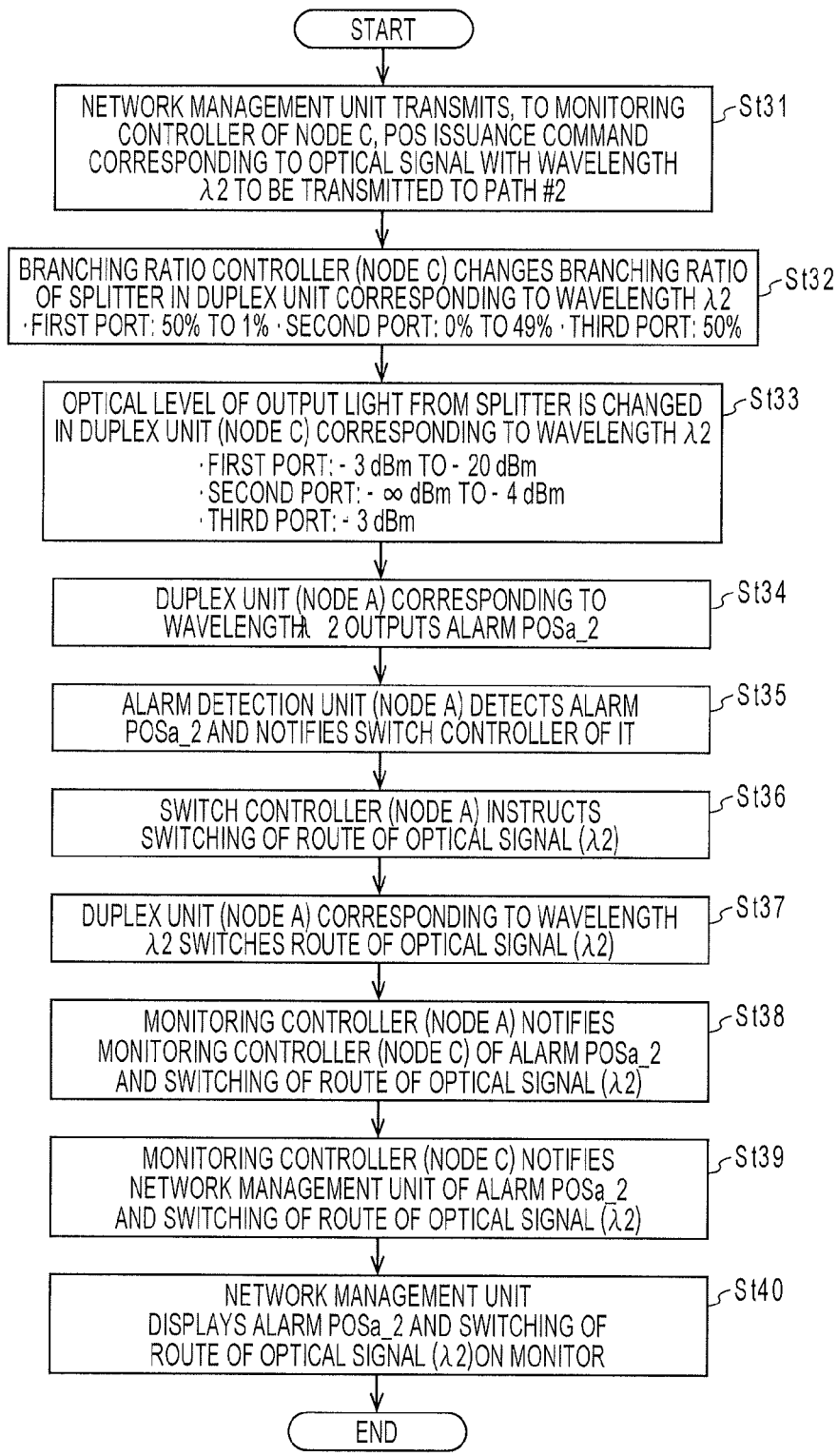

OPTICAL TRANSMISSION DEVICE, OPTICAL TRANSMISSION SYSTEM, AND TEST METHOD FOR ALARM FUNCTION

CROSS-REFERENCE TO RELATED APPLICATION

This application is based upon and claims the benefit of priority of the prior Japanese Patent Application No. 2013-117306, filed on Jun. 3, 2013, the entire contents of which are incorporated herein by reference.

FIELD

The embodiment discussed herein is related to an optical transmission device, an optical transmission system, and a test method for an alarm function.

BACKGROUND

As demand of communication increases, optical networks using wavelength division multiplexing (WDM) have come into widespread use. Wavelength division multiplexing is a technique that transfers a plurality of optical signals with different frequencies by multiplexing them. In wavelength division multiplexing, for example, 88 optical signals that have different wavelengths and a transmission rate of 40 Gbps may be transmitted as an optical wavelength multiplexed signal (referred to below as an optical multiplexed signal) by multiplexing them.

An optical add-drop multiplexer referred to as, for example, a reconfigurable optical add-drop multiplexer (ROADM) is known as an optical transmission device using wavelength division multiplexing. A ROADM device has a transceiver for optical signals referred to as, for example, a transponder.

A ROADM device transmits, to another node, an optical multiplexed signal in which a plurality of signals with arbitrary wavelengths input from a plurality of transponders are multiplexed, and separates a signal with an arbitrary wavelength from an optical multiplexed signal received from another node and outputs it to a transponder. That is, a ROADM device inserts or branches an optical signal with an arbitrary wavelength.

A ROADM device has an optical splitter and a wavelength selective switch (WSS) for each path. A path is a transmission channel that runs toward another node in a network.

An optical splitter outputs an optical multiplexed signal input from a corresponding path, to the wavelength selective switches and transponders of the other paths. A wavelength selective switch selects, from optical multiplexed signals input from the optical splitters and transponders of the other paths, an optical signal with the wavelength to be output, multiplexes the selected signal, and outputs it as an optical multiplexed signal to a corresponding path.

When a network is extended, the number of nodes to which ROADM devices are connected increases and the number of paths to which connection is made also increases. Accordingly, a job for adding transponders, optical splitters, and wavelength selective switches to ROADM devices arises. In this job, transponders, optical splitters, and wavelength selective switches have to be interconnected via many optical fibers.

For example, Japanese Laid-open Patent Publication No. 2006-310963 discloses a technique for controlling the branching ratio of a variable optical coupler on the drop side according to an optical input level and optical output level of a ROADM device. In addition, Shinlin Xiao and seven others, "Tunable optical Splitter technology", *Proceedings of SPIE*, vol. 4870, pp. 532-539, 2002 discloses a technique for a tunable optical splitter.

SUMMARY

According to an aspect of the invention, an optical transmission device includes a splitter configured to have at least a first port, a second port, and a third port that output branched input light, branching ratios of the first port and the second port being variable, and a controller configured to reduce an optical level of output light from the first port to be monitored and increase an optical level of output light from the second port according to the reduced optical level of output light from the first port by controlling the branching ratios.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a table depicting output conditions of alarms;

FIG. 9 is a diagram depicting the operation of the ROADM device of node A in test example (2) of the alarm function;

FIG. 10 is a flowchart describing a test procedure of alarm INDWN;

FIG. 11 is a flowchart describing a test procedure of alarm POS;

DESCRIPTION OF EMBODIMENT

When a network is extended, after a transponder, optical splitter, and wavelength selection switch is added to a ROADM device, the alarm function of the ROADM device is tested. In the test of the ROADM device, the maintenance person confirms that a predetermined alarm is issued in the corresponding point if an optical fiber is disconnected, for example. This ensures that the optical fiber is correctly connected. For a ring type network, it is possible to check the optical uni-direction path switched ring (OUPSR) function, which switches the transmission route from an active system to a standby system if a failure occurs (an alarm is issued). It is important for such confirmation work to have no effects on a communication line being used.

However, since many optical fibers are wired in the ROADM device, it is difficult to find the optical fiber of interest in the confirmation work. For example, if an optical fiber being used is disconnected in error, communication is interrupted. In addition, light emitted from the disconnected optical fiber may damage the health of the maintenance person. Such problems are not limited to the ROADM device and may occur in other optical transmission devices.

An optical transmission device, an optical transmission system, and a test method for an alarm function for outputting an alarm through remote control during operation will be described with reference to the drawings.

Figure 1:
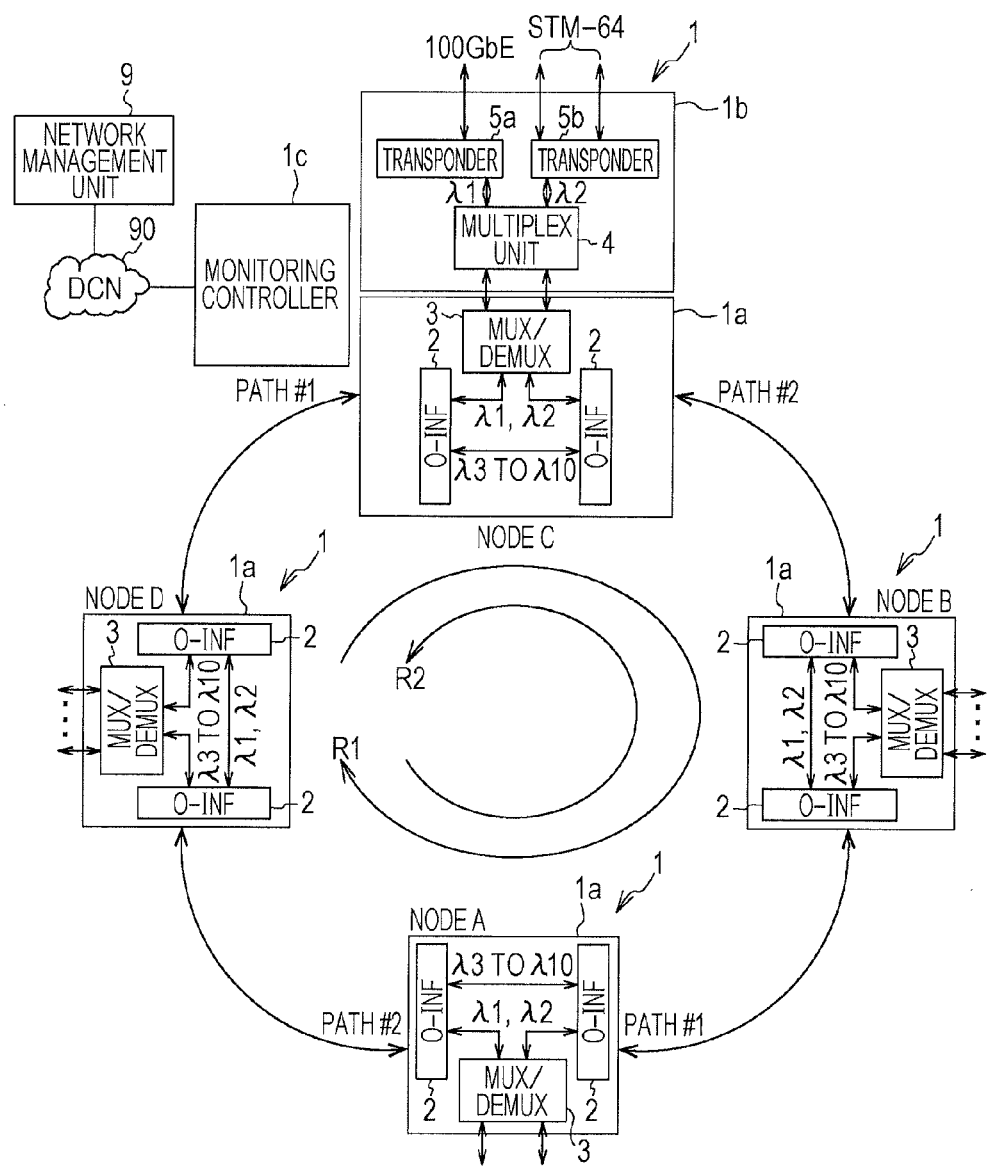
FIG. 1 is a structural diagram depicting the structure an optical transmission system according to an embodiment.

FIG. 1 is a structural diagram depicting the structure an optical transmission system according to an embodiment. The optical transmission system includes, for example, nodes A to D that are connected via transmission paths so as to form a ring type network.

A ROADM device 1 is disposed in each of nodes A to D. Each ROADM device 1 transmits an optical multiplexed signal in which a plurality of optical signals with different wavelengths are multiplexed, to the ROADM device 1 of an adjacent node via an optical fiber. The following description assumes the optical transmission device to be the ROADM device 1, but the optical transmission device is not limited to the ROADM device 1 and applicable to another type of optical transmission device.

The ROADM device 1 includes a core unit 1a, an in-node interface 1b, and a monitoring controller 1c. In FIG. 1, the in-node interface 1b and the monitoring controller 1c are not depicted in each of the optical transmission devices of nodes A, B, and D. Accordingly, the structure of the ROADM device 1 of node C will be described below, but the ROADM devices 1 of nodes A, B, and D have the same structure as node C.

The core unit is includes optical interfaces (O-INFs) 2 and a multiplex/demultiplex (MUX/DEMUX) unit 3. One O-INF 2 is provided for each of paths #1 and #2. The optical multiplexed signal input from paths #1 and #2 is output to the other O-INF 2 and the MUX/DEMUX unit 3. In addition, the O-INF 2 multiplexes an optical signal inserted from the MUX/DEMUX unit 3 with an optical signal that is forced to pass through the node and transmits it to an adjacent node.

The MUX/DEMUX unit 3 separates the optical signals with wavelengths $\lambda 1$ and $\lambda 2$ to be branched, from the optical multiplexed signal input from the O-INF 2, and outputs them to the in-node interface 1b. In addition, when the optical signals with wavelengths $\lambda 1$ and $\lambda 2$ to be added are input from the in-node interface 1b, the MUX/DEMUX unit 3 multiplexes the optical signals with wavelengths $\lambda 1$ and $\lambda 2$ and outputs them to the O-INF 2.

In the optical network in this example, the optical signals with wavelengths $\lambda 1$ and $\lambda 2$ are branched and inserted at nodes A and C, and the optical signals with wavelengths $\lambda 3$ to $\lambda 10$ are branched and inserted at nodes B and D. Accordingly, the optical signals with wavelengths $\lambda 1$ and $\lambda 2$ pass through nodes B and D and the optical signals with wavelengths $\lambda 3$ and $\lambda 10$ pass through nodes A and C.

The in-node interface 1b includes a duplex unit 4 and the transponders 5a and 5b. For example, the transponder 5a transmits and receives a 100-Gbps Ethernet (100 GbE) signal, and the transponder 5b transmits and receives an STM (synchronous transfer mode) -64 signal obtained by multiplexing, for example, ten wavelengths or four wavelengths. The transponders 5a and 5b input and output optical signals with wavelengths $\lambda 1$ and $\lambda 2$ that correspond to the signals transmitted to or received from the duplex unit 4.

The duplex unit 4 carries out the OUPSR function and switches the routes of optical signals with wavelengths $\lambda 1$ and $\lambda 2$. The ROADM devices 1 of nodes A and C transmit and receive an optical signal with wavelengths $\lambda 1$ and $\lambda 2$ each other. At this time, the optical signals with wavelengths $\lambda 1$ and $\lambda 2$ are transmitted via both a route passing through node D and a route passing through node B. That is, the optical signals with wavelengths $\lambda 1$ and $\lambda 2$ are transmitted via a route R1 that runs clockwise on the sheet of FIG. 1 and a route R2 that runs counterclockwise on the sheet of FIG. 1.

The duplex unit 4 selects one of the routes R1 and R2, receives the optical signals with wavelengths $\lambda 1$ and $\lambda 2$, and outputs the received signals to the transponders 5a and 5b. Switching between the routes R1 and R2 is performed when, for example, reception of the optical signal is disabled due to a transmission path (optical fiber) failure or when the optical level of a light signal is reduced. One of the routes R1 and R2 may be used as an active system or standby system.

The monitoring controller 1c monitors and controls the core unit 1a and the in-node interface 1b. The monitoring controller is connected to a network management unit 9 via a data communication network (DCN) 90. The network management unit 9 communicates with the monitoring controller 1c via the DCN 90.

The monitoring controller 1c relays communication between the network management unit 9 and the monitoring controllers 1c of the other nodes A, B, and D. This communication is carried out by using a general communication channel (GCC) formed in, for example, a part (such as a header) of main signals (optical signals with wavelengths $\lambda 1$ to $\lambda 10$). Communication with the network management unit 9 is not limited to such an in-band control form and may be performed by using an optical signal of a waveform specific to monitoring control.

Figure 2:
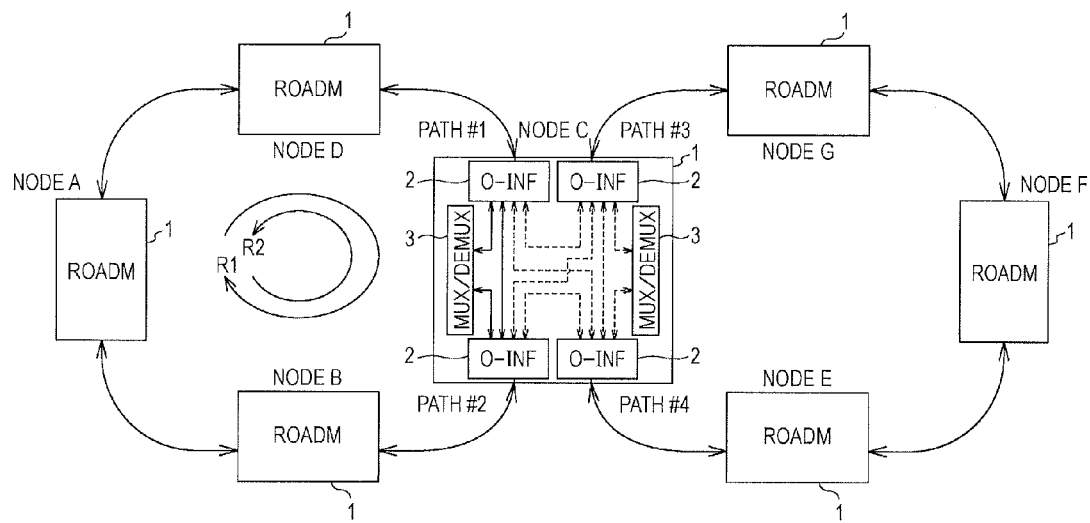
FIG. 2 is a structural diagram depicting an example of an extended optical transmission system.

FIG. 2 is a structural diagram depicting an example of an extended optical transmission system. More specifically, FIG. 2 depicts an 8-shaped optical network extended by connecting the optical transmission system depicted in FIG. 1 to another ring type network having nodes E to G at node C. In FIG. 2, the in-node interface 1*b* and the monitoring controller is are not depicted.

In this extension, path #3 for new adjacent node G and path #4 for new adjacent node E are provided for the ROADM device 1 of node C in addition to path #1 for adjacent node D and path #2 for adjacent node B. Accordingly, the O-INFs 2 and the MUX/DEMUX unit 3 that correspond to new paths #3 and #4 are added to the ROADM device 1 of node C. Therefore, new optical fibers as depicted by dotted lines are wired in the ROADM device 1 of node C. Even in this case, the optical transmission device according to the embodiment is able to output an alarm through remote control without affecting lines being used.

Figure 3:
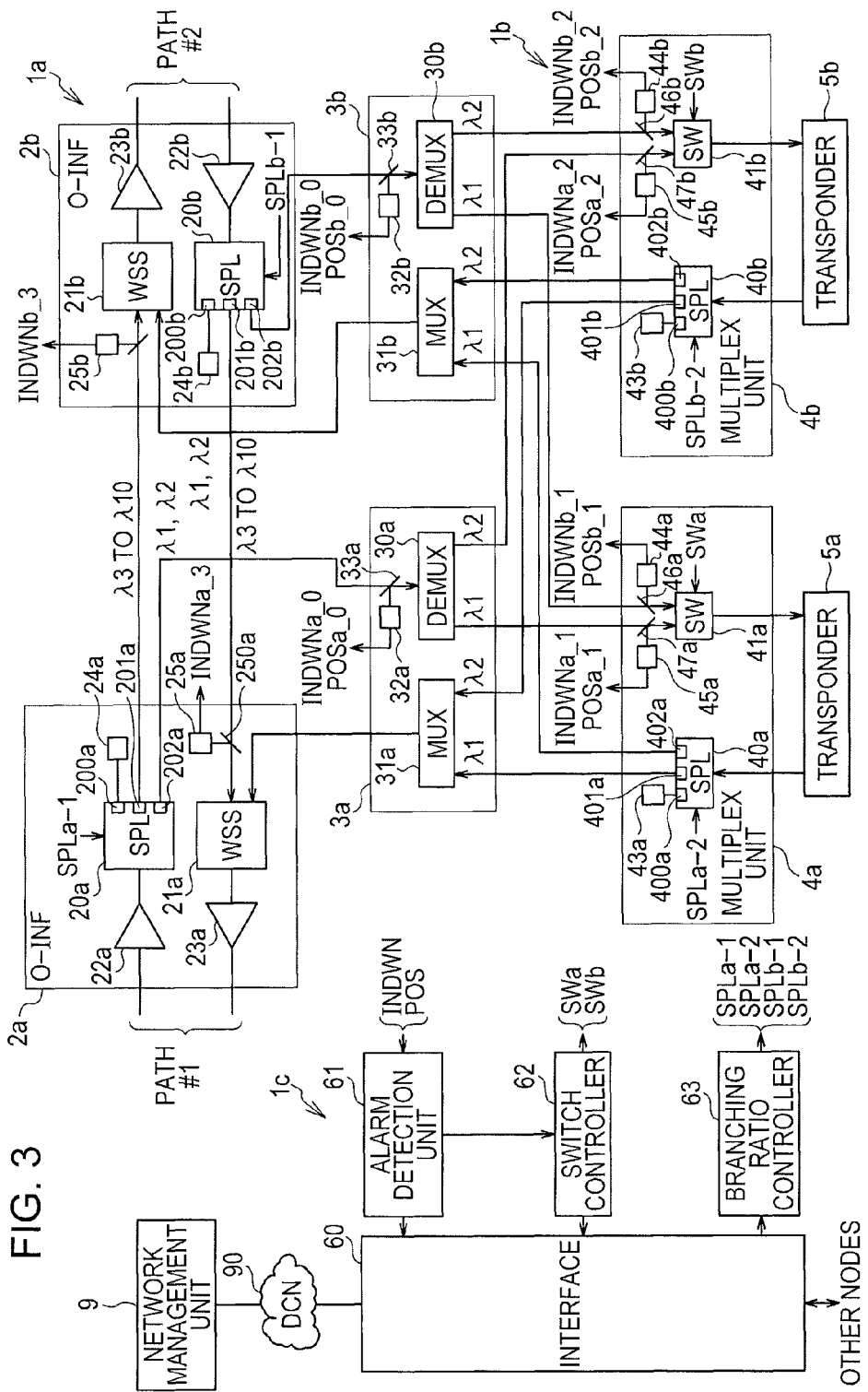
FIG. 3 is a structural diagram depicting the functional structure of an optical transmission device according to the embodiment.

FIG. 3 is a structural diagram depicting the functional structure of an optical transmission device according to the embodiment. More specifically, FIG. 3 depicts the structure of the above ROADM device 1 in more detail. Although FIG. 3 depicts the structure of the ROADM device 1 of node C depicted in FIG. 1, the ROADM devices 1 of nodes A, B, and D also have the same structure except that the monitoring controller is not directly connected to the DCN 90.

The ROADM device 1 includes the core unit 1*a*, the in-node interface 1*b*, and the monitoring controller 1*c*. The core unit is includes an O-INF 2*a* and a MUX/DEMUX unit 3*a* for path #1 and an O-INF 2*b* and a MUX/DEMUX unit 3*b* for path #2.

The O-INFs 2*a* and 2*b* have splitters 20*a* and 20*b*, wavelength selective switches 21*a* and 21*b*, input amplifiers 22*a* and 22*b*, and output amplifiers 23*a* and 23*b* respectively. The O-INFs 2*a* and 2*b* further includes optical terminator 24*a* and 24*b*, alarm output units 25*a* and 25*b*, and optical splitters 250*a* and 250*b*, respectively. The input amplifiers 22*a* and 22*b* amplifies optical multiplexed signals input from the corresponding paths and outputs the amplified signals to the splitters 20*a* and 20*b*, respectively.

The splitters 20*a* and 20*b* have three output ports (first to third ports) 200*a* to 202*a* and output ports 200*b* to 202*b*, respectively. A different branching ratio can be set for each of the output ports. The splitters 20*a* and 20*b* branch optical multiplexed signals (input light) input from the input amplifiers 22*a* and 22*b* and output them from the output ports 200*a* to 202*a* and the output ports 200*b* to 202*b*, respectively. Details on the structure of the splitters 20*a* and 20*b* will be described later.

The optical multiplexed signals output from the output ports 200*a* and 200*b* are terminated by the optical terminator 24*a* and 24*b*. When the branching ratio of other output ports is reduced, the output ports 200*a* and 200*b* increase its own branching ratio so as to release the excess optical power unable to be output from the other output ports to the optical terminators 24*a* and 24*b*. The optical terminators 24*a* and 24*b* absorb output light from the output ports 200*a* and 200*b* to keep the light from leaking externally.

The optical multiplexed signals output from the output ports 201*a* and 201*b* are input to the wavelength selective switches 21*a* and 21*b* of the O-INFs 2*b* and 2*a* of the other path. The wavelength selective switches 21*a* and 21*b* receive the optical multiplexed signals from the MUX/DEMUX units 3*a* and 3*b* in addition to the optical multiplexed signals from the output ports 201*a* and 201*b*, respectively. The optical multiplexed signals from the MUX/DEMUX unit 3 include optical signals with wavelengths λ1 and λ2 to be inserted.

The wavelength selective switch 21*a* and 21*b* multiplex optical signals of the wavelength set and selected by the monitoring controller is and output them as an optical multiplexed signal to the output amplifiers 23*a* and 23*b*. The wavelength selective switches 21*a* and 21*b* multiplex selected optical signals with wavelengths λ3 to λ10 with optical signals with wavelengths λ1 and λ2 to be added, from the optical multiplexed signals from the output ports 201*a* and 201*b*. The output amplifiers 23*a* and 23*b* amplify optical multiplexed signals from the wavelength selective switches 21*a* and 21*b* and output them to paths #1 and #2.

The optical multiplexed signals output from the output ports 201*a* and 201*b* are branched by the optical splitters 250*b* and 250*a* at a front stage of the wavelength selective switches 21*b* and 21*a* and input to the alarm output units 25*b* and 25*a*.

The alarm output units 25*a* and 25*b* monitor the optical levels of output light from the output ports 201*a* and 201*b* and output alarms INDWNa_3 or INDWNb_3 according to the optical levels, respectively. The optical levels are monitored by a photo accepter such as, for example, a photo detector (PD).

The output conditions of alarms INDWNa_3 and INDWNb_3 are depicted in FIG. 4. That is, alarms INDWNa_3 and INDWNb_3 indicate that the optical multiplexed signals from the output ports 201*a* and 201*b* have been interrupted.

Accordingly, it is possible to output alarms INDWNa_3 and INDWNb_3 from the alarm output units 25*a* and 25*b* by reducing the branching ratios of the output ports 201*a* and 201*b* to reduce the optical level. Alarms INDWNa_3 and INDWNb_3 are detected by the monitoring controller 1*c*.

The optical multiplexed signals output from the output ports 202*a* and 202*b* are input to the MUX/DEMUX units 3*a* and 3*b* of the corresponding paths #1 and #2. The MUX/DEMUX units 3*a* and 3*b* include MUXs 31*a* and 31*b*, DEMUXs 30*a* and 30*b*, alarm output units 32*a* and 32*b*, and optical splitters 33*a* and 33*b*.

The MUXs 31*a* and 31*b* multiplex and output a plurality of optical signals of different wavelengths. The DEMUXs 30*a* and 30*b* separate the optical multiplexed signals into optical signals with different wavelengths and output them. For example, arrayed waveguide gratings (AWG) are used as the MUXs 31*a* and 31*b* and the DEMUXs 30*a* and 30*b*. However, wavelength selective switches may be used instead.

The DEMUXs 30*a* and 30*b* separate optical signals with wavelengths λ1 and λ2 to be branched from the optical multiplexed signals input from the output ports 202*a* and 202*b* and outputs them to the duplex units 4*a* and 4*b*, respectively. The MUXs 31*a* and 31*b* multiplex optical signals with wavelengths λ1 and λ2 to be branched that are input from the duplex units 4*a* and 4*b*, respectively, and output them to the wavelength selective switches 21*a* and 21*b*.

The optical multiplexed signals output from the output ports 202*a* and 202*b* are branched by the optical splitters 33*a* and 33*b* at a front stage of the DEMUXs 30*a* and 30*b* and output to the alarm output units 32*a* and 32*b*.

The alarm output unit 32*a* monitors the optical level of output light from the output port 202*a* and outputs alarms INDWNa_0 or POSa_0 according to the optical level. The alarm output unit 32*b* monitors the optical level output light from the output port 202*b* and outputs alarm INDWNb_0 or POSb_0 according to the optical level. The optical level is monitored by a photo accepter such as, for example, a PD.

The output conditions of alarms INDWNa_0, INDWNb_0, POSa_0, and POSb_0 are depicted in FIG. 4. That is, alarms INDWNa_0 and INDWNb_0 indicate that the optical multiplexed signals from the output ports 202a and 202b have been interrupted, respectively. Alarms POSa_0 and POSb_0 indicate that the optical multiplexed signals from the output ports 202a and 202b have been degraded, respectively.

Accordingly, it is possible to output alarms INDWNa_0, INDWNb_0, POSa_0, and POSb_0 from the alarm output units 32a and 32b by reducing the branching ratios of the output ports 202a and 202b to reduce the optical level. Alarms INDWNa_0, INDWNb_0, POSa_0, and POSb_0 are detected by the monitoring controller 1c.

The duplex unit 4a processes an optical signal with wavelength λ1. The duplex unit 4a includes a splitter 40a, a switch 41a, an optical terminator 43a, alarm output units 45a and 44a, and optical splitters 47a and 46a. The duplex unit 4b processes an optical signal with wavelength λ2. The duplex unit 4b includes a splitter 40b, a switch 41b, an optical terminator 43b, alarm output units 45b and 44b, and optical splitters 47b and 46b.

The splitters 40a and 40b have three output ports (first to third ports) 400a to 402a and output ports 400b to 402b, respectively. A different branching ratio can be set for each of the output ports. The splitter 40a receives an optical signal (input light) with wavelength λ1 from the transponder 5a and the splitter 40b receives an optical signal (input light) with wavelength λ2 from the transponder 5a. The splitters 40a and 40b branch the input light and outputs the branched light from the output ports 400a to 402a and output ports 400b to 402b. Details on the structure of the splitters 40a and 40b will be described later.

The optical multiplexed signals output from the output ports 400a and 400b are terminated by the optical terminator 43a and 43b. When the branching ratio of other output ports is reduced, the output ports 400a and 400b increase its own branching ratio so as to terminate the excess optical power unable to be output from the other output ports using the optical terminators 43a and 43b. The optical terminators 43a and 43b absorb output light from the output ports 400a and 400b to keep the light from leaking externally.

Optical signals with wavelength λ1 output from output ports 401a and 402a are input to the MUXs 31a and 31b, respectively. Optical signals with wavelength λ2 output from output ports 401b and 402b are input to the MUXs 31a and 31b, respectively. Optical signals with wavelengths λ1 and λ2 multiplexed by the MUX 31a are output to path #1 via the wavelength selective switch 21a and the output amplifier 23a, pass through the route R2 in FIG. 1, and are branched at node A. On the other hand, optical signals with wavelengths λ1 and λ2 multiplexed by the MUX 31b are output to path #2 via the wavelength selective switch 21b and the output amplifier 23b, pass through the route R1 in FIG. 1, and are branched at node A. That is, the optical signals with wavelengths λ1 and λ2 multiplexed by the MUXs 31a and 31b reach node C via the routes R2 and R1, which are different from each other.

The light signals with wavelength λ1 output from the DEMUXs 30a and 30b are input to the switch 41a. The switch 41a selects one of the two input optical signals as a reception target and outputs the selected optical signal to the transponder 5a. The transponder 5a receives the selected optical signal and outputs the received optical signal externally as a 100 GbE signal.

The light signals with wavelength λ2 output from the DEMUXs 30a and 30b are input to the switch 41b. The switch 41b selects one of the two input optical signals and outputs the selected optical signal to the transponder 5b. The transponder 5b receives the selected optical signal and outputs the received optical signal externally as an STM-64 signal.

The optical signals with wavelengths λ1 and λ2 output from the DEMUX 30a are inserted at node A, pass through the route R1, and branched at node C, as depicted in FIG. 1. On the other hand, the optical signals with wavelengths λ1 and λ2 output from the DEMUX 30b are inserted at node A, pass through the route R2, and branched at node C.

Accordingly, the switch 41a may select the routes R1 or R2 of the optical signal with wavelength λ1 that becomes a reception target of the transponder 5a and the switch 41b may select the routes R1 or R2 of the optical signal with wavelength λ2 that becomes a reception target of the transponder 5b. That is, the switches 41a and 41b may switch between the routes R1 and R2 of optical signals with wavelengths λ1 and λ2. Detection of an alarm causes the monitoring controller 1c to output switching signals SWa and SWb for instructing the switches 41a and 41b for switching.

The optical signals with wavelength λ1 output from the DEMUXs 30a and 30b are branched by the optical splitters 47a and 46a at a front stage of the switches 41a and input to the alarm output units 45a and 44a.

The alarm output unit 45a monitors the optical level of the optical signal with wavelength λ1 output from the DEMUX 30a and outputs alarm INDWNa_1 or POSa_1 according to the optical level. That is, the alarm output unit 45a monitors the optical level of output light from the output port 402a of the splitter 40a in the ROADM device 1 of node A, and outputs alarm INDWNa_1 or POSa_1 according the optical level.

On the other hand, the alarm output unit 44a monitors the optical level of the optical signal with wavelength λ1 output from the DEMUX 30b and outputs alarm INDWNb_1 or POSb_1 according to the optical level. That is, the alarm output unit 44a monitors the optical level of output light from the output port 401a of the splitter 40a in the ROADM device 1 of node A, and outputs alarm INDWNb_1 or POSb_1 according the optical level. The optical level is monitored by a photo accepter such as, for example, a PD.

The output conditions of alarms INDWNa_1, INDWNb_1, POSa_1, and POSb_1 are depicted in FIG. 4. That is, alarms INDWNa_1 and INDWNb_1 indicate that the optical signals with wavelength λ1 from the output ports 402a and 401a of the splitter 40a in the ROADM device 1 of node A have been interrupted. Alarms POSa_1 and POSb_1 indicate that the optical signals with wavelength λ1 from the output ports 402a and 401a of the splitter 40a in the ROADM device 1 of node A have been degraded.

Accordingly, it is possible to output alarms INDWNa_1, INDWNb_1, POSa_1, and POSb_1 from the alarm output units 45a and 44a by reducing the branching ratios of the output ports 402a and 401a of the splitter 40a to reduce the optical level in the ROADM device 1 of node A. This is the same if node A is changed to node C. Alarms INDWNa_1, INDWNb_1, POSa_1, and POSb_1 are detected by the monitoring controller 1c.

The optical signals with wavelength λ2 output from the DEMUXs 30a and 30b are branched by the optical splitters 47b and 46b at a front stage of the switches 41b and input to the alarm output units 45b and 44b.

The alarm output unit 45b monitors the optical level of the optical signal with wavelength λ2 output from the DEMUX 30a and outputs alarm INDWNa_2 or POSa_2 according to the optical level. That is, the alarm output unit 45b monitors the optical level of output light from the output port 402b of the splitter 40b in the ROADM device 1 of node A, and outputs alarm INDWNa_2 or POSa_2 according the optical level.

On the other hand, the alarm output unit 44b monitors the optical level of the optical signal with wavelength λ2 output from the DEMUX 30b and outputs alarm INDWNb_2 or POSb_2 according to the optical level. That is, the alarm output unit 44b monitors the optical level of output light from the output port 401b of the splitter 40b in the ROADM device 1 of node A, and outputs alarm INDWNb_2 or POSb_2 according the optical level. The optical level is monitored by a photo accepter such as, for example, a PD.

The output conditions of alarms INDWNa_2, INDWNb_2, POSa_2, and POSb_2 are depicted in FIG. 4. That is, alarms INDWNa_2 and INDWNb_2 indicate that the optical signals with wavelength λ2 from the output ports 402b and 401b of the splitter 40b in the ROADM device 1 of node A have been interrupted. Alarms POSa_2 and POSb_2 indicate that the optical signals with wavelength λ2 from the output ports 402b and 401b of the splitter 40b in the ROADM device 1 of node A have been degraded.

Accordingly, it is possible to output alarms INDWNa_2, INDWNb_2, POSa_2, and POSb_2 from the alarm output units 45b and 44b by reducing the branching ratios of the output ports 402b and 401b of the splitter 40b to reduce the optical level in the ROADM device 1 of node A. This is the same if node A is changed to node C. Alarms INDWNa_2, INDWNb_2, POSa_2, and POSb_2 are detected by the monitoring controller 1c.

The monitoring controller 1c includes an interface 60, an alarm detection unit 61, a switch controller 62, and a branching ratio controller 63. The monitoring controller is operated by causing a processor such as a central processing unit (CPU) to read software.

The interface 60 is connected to the DCN 90 and communicates with the network management unit 9. The interface 60 relays communication with the network management unit 9. At this time, the interface 60 relays communication by inserting information into or extracting information from the header of a main signal.

The alarm detection unit 61 detects an alarm output from the alarm output unit 25a, 25b, 32a, 32b, 44a, 44b, 45a, or 45b and notifies the network management unit 9 of the alarm via the interface 60. When the alarm detection unit 61 detects an alarm INDWNa_1, INDWNb_1, POSa_1, POSb_1, INDWNa_2, INDWNb_2, POSa_2, or POSb_2, the alarm detection unit 61 notifies the switch controller 62 of the alarm.

The switch controller 62 outputs switching signals SWa and SWb to the switches 41a and 41b in response to a notification of the alarm. When, for example, the alarm output unit 45a outputs an alarm, the switch controller 62 outputs switching signal SWa so that the switch 41a selects the optical signal output from the DEMUX 30b. When, for example, the alarm output unit 45b outputs an alarm, the switch controller 62 outputs switching signal SWb so that the switch 41b selects the optical signal output from the DEMUX 30b. This enables the switch controller 62 to achieve the OUPSR function.

The branching ratio controller 63 controls the branching ratios of the splitters 20a, 20b, 40a, and 40b for each output port by outputting control signals SPLa-1, SPLb-1, SPLa-2, and SPLb-2 to the splitters 20a, 20b, 40a, and 40b. According to an alarm output command from the network management unit 9 received via the interface 60, the branching ratio controller 63 controls the branching ratios of the splitters 20a, 20b, 40a, and 40b corresponding to the alarm for each output port. Since this reduces the optical level of the optical signals to be monitored, the alarm output units 25a, 25b, 44a, 44b, 45a, and 45b output the alarm. Examples of testing the alarm function will be described in detail below.

Test Example (1) of the Alarm Function

This example performs a test in which the alarm output unit 45a in the MUX/DEMUX unit 3 on the path #1 side output alarm INDWNa_0 and the alarm output unit 45b in the MUX/DEMUX unit 3 on the path #2 side output alarm POSb_0.

Figure 5:
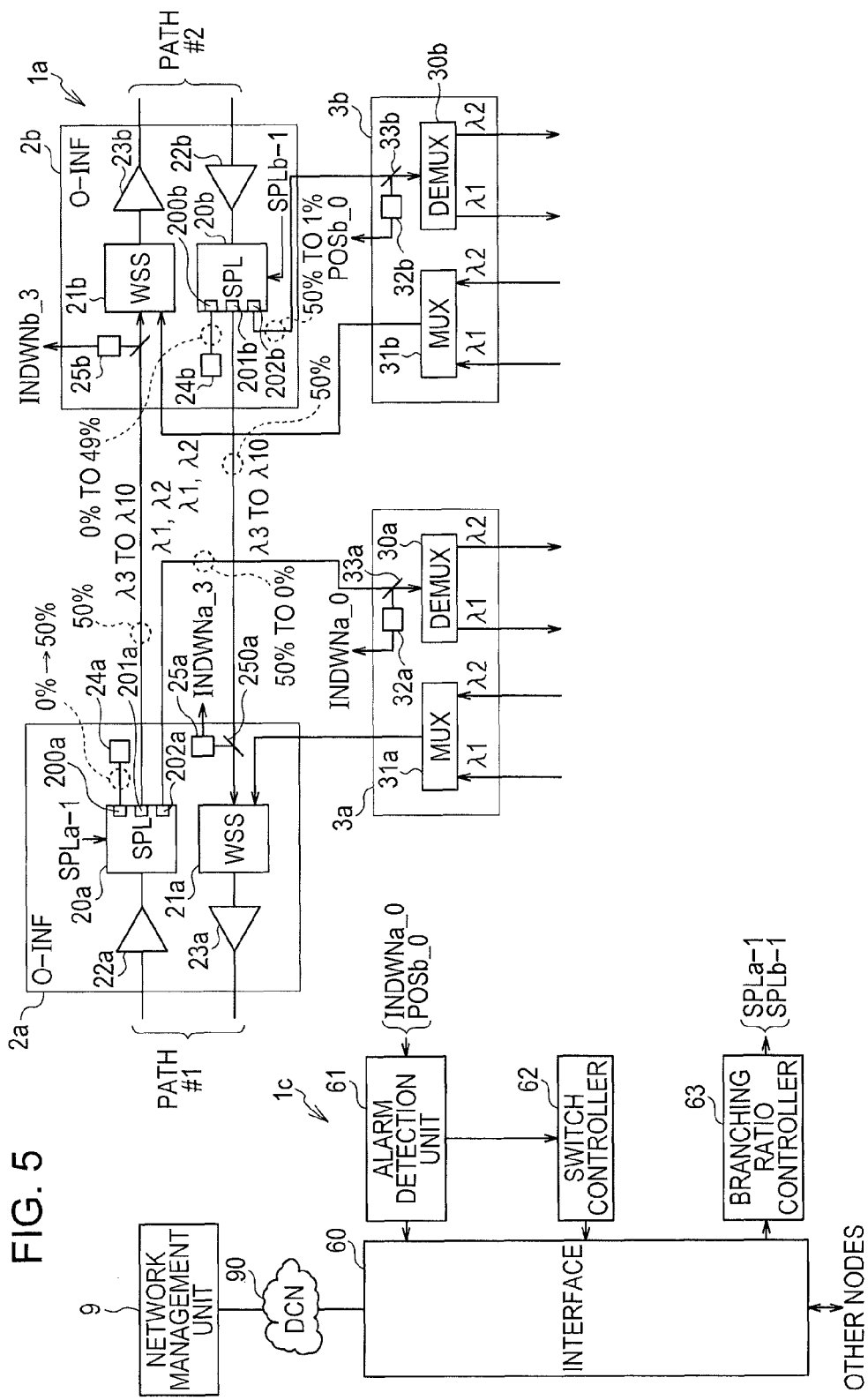
FIG. 5 is a diagram depicting the operation of a ROADM device in test example (1) of an alarm function.
Figure 6:
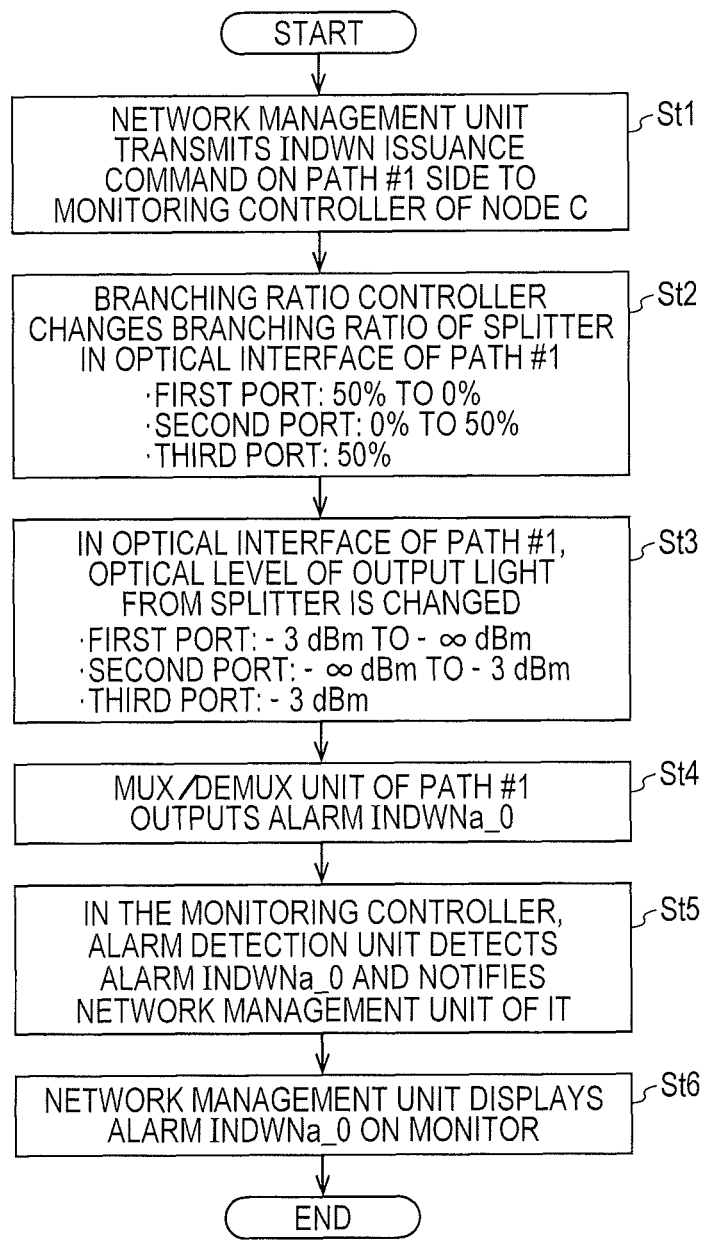
FIG. 6 is a flowchart describing a test procedure of alarm INDWN.

FIG. 5 depicts the operation of a ROADM device 1 in this example. The components in FIG. 5 that are common to those in FIG. 3 are given the same reference numerals and their descriptions are omitted. FIG. 6 is a flowchart describing a test procedure of alarm INDWN. According to the flow in FIG. 6, the test procedure will be described with reference to FIG. 5.

First, the network management unit 9 transmits an INDWN issuance command on the path #1 side to the monitoring controller 1c of node C according to an operation of the maintenance person (operation St1). The alarm issuance command is generated by, for example, the maintenance person selecting a node to be tested, an alarm type (such as INDWN or POS), and so on in a monitor (display screen) of the network management unit 9. The INDWN issuance command is received by the interface 60 of node C via DCN 90, converted into an appropriate control code, and output to the branching ratio controller 63.

Next, the branching ratio controller 63 changes the branching ratio of splitter 20a in the O-INF 2a of path #1 for each of the output ports 200a to 202a (operation St2). The branching ratio controller 63 controls the branching ratio by outputting control signal SPLa-1 to the splitter 20a. The branching ratio of the first port 202a is changed from 50% to 0% and the branching ratio of the second port 200a is changed from 0% to 50%. The branching ratio of the third port 201a remains at 50%.

Next, in the O-INF 2a of path #1, the optical levels of the optical multiplexed signals (output light) of the output ports 200a to 202a of the splitter 20a are changed (operation St3). For example, the optical level of the first port 202a is changed from −3 dBm to −∞ dBm and the optical level of the second port 200a is changed from −∞ dBm to −3 dBm. The optical level of the third port 201a is remains at −3 dBm.

As described above, the branching ratio controller 63 reduces the optical level of output light from the first port 202a by reducing the branching ratio of the first port 202a. The branching ratio controller 63 increases the optical level of output light from the second port 200a according to the reduced optical level of output light from the first port 202a by increasing the branching ratio of the second port 200a.

Accordingly, excess light (optical power) generated due to reduction in the optical level of output light from the first port 202a passes through the second port 200a and is terminated by the optical terminator 24a. Therefore, even when an optical signal on a line being used is output from the third port 201a, the optical level of output light from the third port 201a is not affected by changes in the branching ratio and remains at a fixed value, giving no effects on the line being used. That is, the branching ratio controller 63 controls the branching ratio so that the optical level of output light from the third port 201a is maintained.

Next, in the MUX/DEMUX unit 3a of path #1, since the alarm output unit 32a monitors the optical multiplexed signal (output light) from the first port 202a, the alarm output unit 32a outputs alarm INDWNa_0 (operation St4). That is, since the optical level of the first port 202a becomes $-\infty$ dBm, which is less than the threshold ($-50$ dBm), the output conditions of INDWNa_0 depicted in FIG. 4 are satisfied.

Next, in the monitoring controller 1c, the alarm detection unit 61 detects alarm INDWNa_0 and notifies the network management unit 9 of it (operation St5). At this time, the alarm detection unit 61 transmits alarm INDWNa_0 input from the alarm output unit 32a to the network management unit 9 via the interface 60 and the DCN 90.

Next, the network management unit 9 displays alarm INDWNa_0 on a monitor (operation St6). This allows the maintenance person to confirm that the alarm is correctly output through remote control using the network management unit 9. Alarm INDWN is tested as described above.

Figure 7:
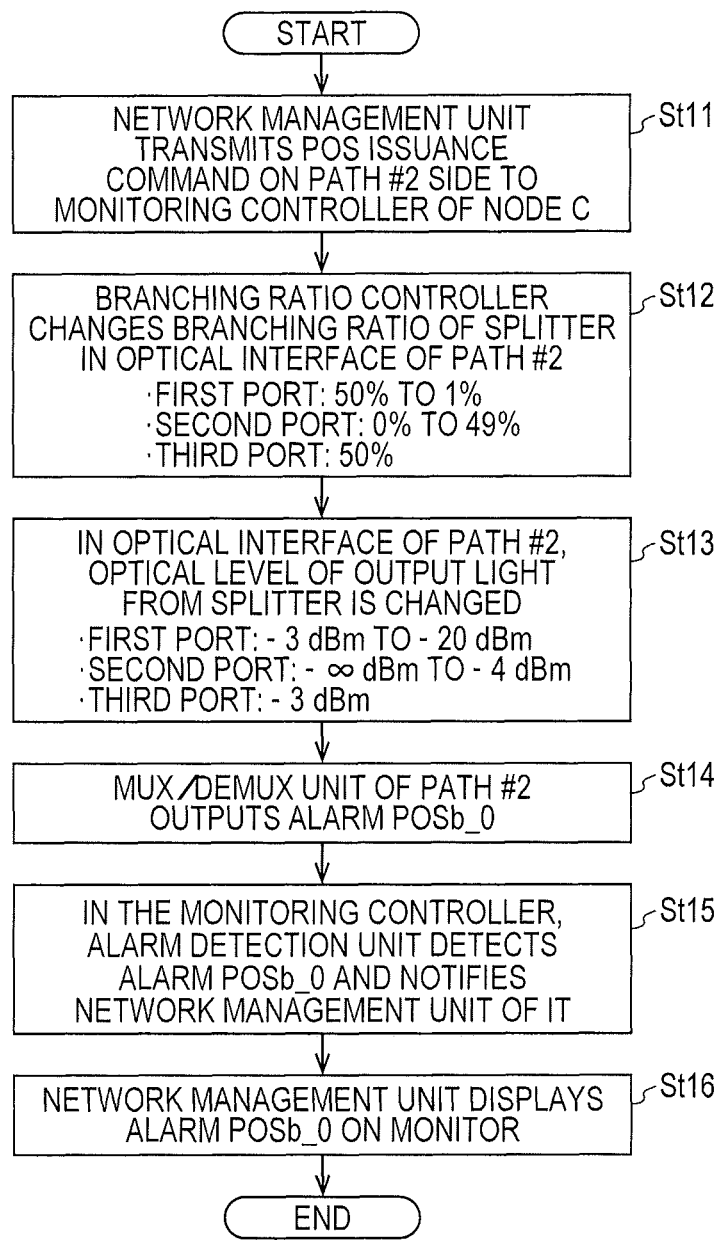
FIG. 7 is a flowchart describing a test procedure of alarm POS.

FIG. 7 is a flowchart describing a test procedure of alarm POS. According to the flow in FIG. 7, the test procedure will be described with reference to FIG. 5.

First, the network management unit 9 transmits an POS issuance command on the path #2 side to the monitoring controller 1c of node C according to an operation of the maintenance person (operation St11). The POS issuance command is received by the interface 60 of node C via the DCN 90, converted into an appropriate control code, and output to the branching ratio controller 63.

Next, the branching ratio controller 63 changes the branching ratio of splitter 20b in the O-INF 2b of path #2 for each of the ports 200b to 202b (operation St12). The branching ratio controller 63 controls the branching ratio by outputting control signal SPLb-1 to the splitter 20a. The branching ratio of the first port 202b is changed from 50% to 1% and the branching ratio of the second port 200b is changed from 0% to 49%. The branching ratio of the third port 201b remains at 50%.

Next, in the O-INF 2b of path #2, the optical levels of the optical multiplexed signals (output light) of the output ports 200b to 202b of the splitter 20b are changed (operation St13). For example, the optical level of the first port 202b is changed from $-3$ dBm to $-20$ dBm and the optical level of the second port 200b is changed from $-\infty$ dBm to $-4$ dBm. The optical level of the third port 201b is remains at $-3$ dBm.

As described above, the branching ratio controller 63 reduces the optical level of output light from the first port 202b by reducing the branching ratio of the first port 202b. The branching ratio controller 63 increases the optical level of output light from the second port 200b according to the reduced optical level of output light from the first port 202b by increasing the branching ratio of the second port 200b.

Accordingly, excess light (optical power) generated due to reduction in the optical level of output light from the first port 202b passes through the second port 200b and is terminated by the optical terminator 24b. Therefore, even when an optical signal on a line being used is output from the third port 201b, the optical level of output light from the third port 201b is not affected by changes in the branching ratio and remains at a fixed value, giving no effects on the line being used. That is, the branching ratio controller 63 controls the branching ratio so that the optical level of output light from the third port 201b is maintained.

Next, in the MUX/DEMUX unit 3b of path #2, since the alarm output unit 32b monitors the optical multiplexed signal (output light) from the first port 202b, the alarm output unit 32a outputs alarm POSb_0 (operation St14).

That is, since the optical level of the first port 202b becomes $-20$ dBm, which falls within the range between the lower threshold ($-50$ dBm) and the upper threshold ($-15$ dBm), the output conditions of POSb_0 depicted in FIG. 4 are satisfied.

Next, in the monitoring controller 1c, the alarm detection unit 61 detects alarm POSb_0 and notifies the network management unit 9 of it (operation St15). At this time, the alarm detection unit 61 transmits alarm POSb_0 input from the alarm output unit 32b to the network management unit 9 via the interface 60 and the DCN 90.

Next, the network management unit 9 displays alarm POSb_0 on a monitor (operation St16). This allows the maintenance person to confirm that the alarm is correctly output through remote control using the network management unit 9. As described above, alarm POS is tested.

Test Example (2) of the Alarm Function

This example performs a test in which the optical level of an optical signal with wavelength $\lambda 1$ that is inserted at node C and transmitted to path #1 is reduced and the alarm output unit 45a in the duplex unit 4a outputs alarm INDWNb_1 at node A, which is the reception side. This example also performs a test in which the optical level of an optical signal with wavelength $\lambda 2$ that is inserted at node C and transmitted to path #2 is reduced and the alarm output unit 45b in the duplex unit 4b outputs alarm POSa_2 at node A, which is the reception side. This example also performs a test in which the OUPSR function that switches the route of an optical signal using alarm output together with the alarm function.

Figure 8:
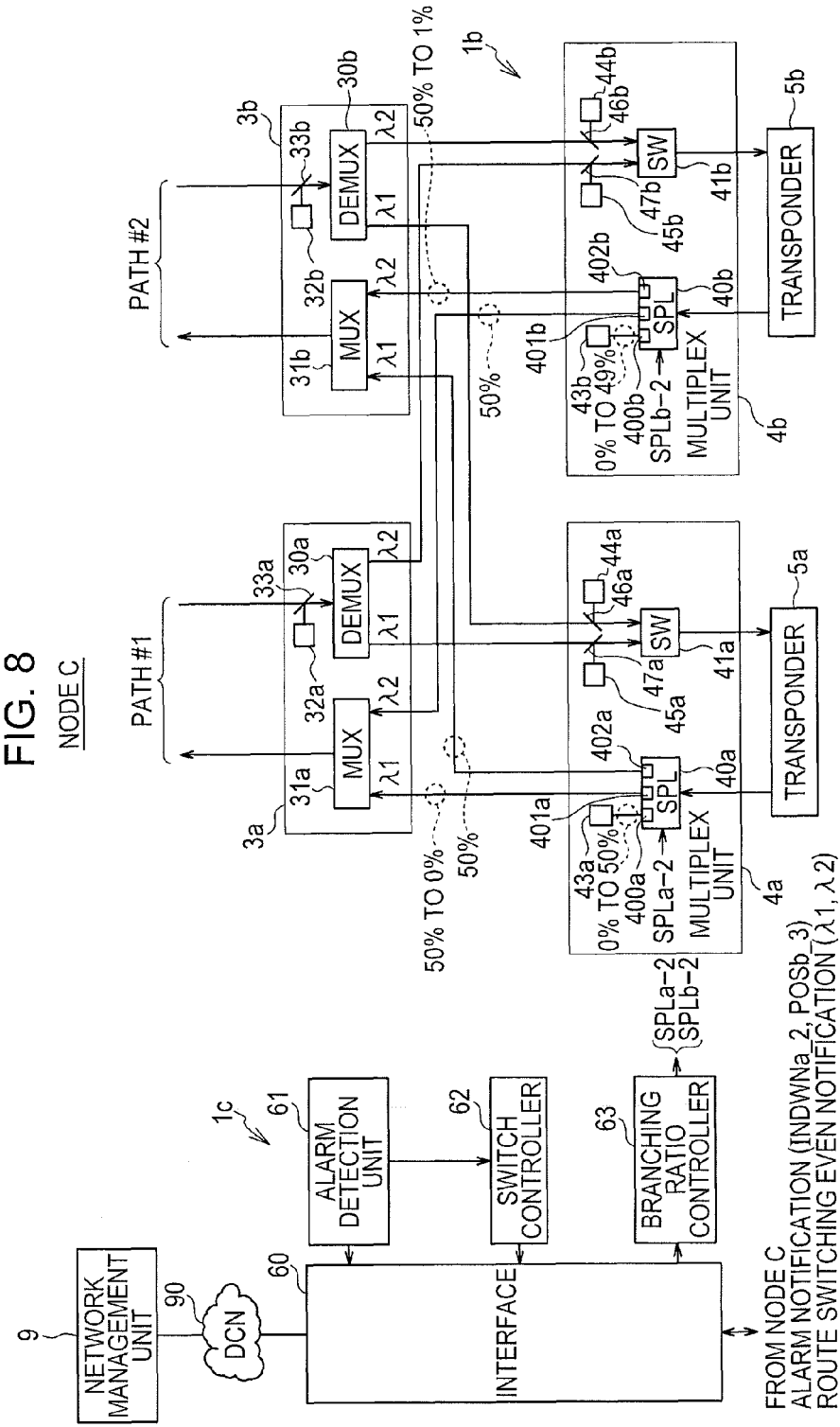
FIG. 8 is a diagram depicting the operation of the ROADM device of node C in test example (2) of the alarm function.

FIG. 8 depicts the operation of the ROADM device 1 of node C in this example. FIG. 9 depicts the operation of the ROADM device 1 of node A in this example. The components in FIGS. 8 and 9 that are common to those in FIG. 3 are given the same reference numerals and their descriptions are omitted.

FIG. 10 is a flowchart describing a test procedure of alarm INDWN. According to the flow in FIG. 10, the test procedure will be described with reference to FIGS. 8 and 9.

First, the network management unit 9 transmits, to the monitoring controller is of node C, an INDWN issuance command corresponding to an optical signal with wavelength $\lambda 1$ to be transmitted to the path #1 according to an operation of the maintenance person (operation St21). The INDWN issuance command is received by the interface 60 of node C via the DCN 90, converted into an appropriate control code, and output to the branching ratio controller 63.

Next, the branching ratio controller 63 changes the branching ratio of splitter 40a in the duplex unit 4a corresponding to wavelength $\lambda 1$ for each of the output ports 400a to 402a (operation St22). The branching ratio controller 63 controls the branching ratio by outputting control signal SPLa-2 to the splitter 40a, as depicted in FIG. 8. The branching ratio of the first port 401a is changed from 50% to 0% and the branching ratio of the second port 400a is changed from 0% to 50%. The branching ratio of the third port 402a remains at 50%.

Next, in the splitter 40a in the duplex unit 4a of node C, the optical levels of the optical signals (output light) with wavelength $\lambda 1$ of the output ports 400a to 402a are changed (operation St23). For example, the optical level of the first port 401a is changed from $-3$ dBm to $-\infty$ dBm and the optical level of the second port 400a is changed from $-\infty$ dBm to $-3$ dBm. The optical level of the third port 401a remains at $-3$ dBm.

As described above, the branching ratio controller 63 reduces the optical level of output light from the first port 401a by reducing the branching ratio of the first port 401a. The branching ratio controller 63 increases the optical level of output light from the second port 400a according to the reduced optical level of output light from the first port 401a by increasing the branching ratio of the second port 400a.

Accordingly, excess light (optical power) generated due to reduction in the optical level of output light from the first port 401a passes through the second port 400a and is terminated by the optical terminator 43a. Therefore, the optical level of output light (optical signal with wavelength of λ1 of another route) from the third port 402a is not affected by changes in the branching ratio and remains at a fixed value. That is, the branching ratio controller 63 controls the branching ratio so that the optical level of output light from the third port 402a is maintained.

Next, as depicted in FIG. 9, at node A on the reception side, since the alarm output unit 44a in the duplex unit 4a corresponding to wavelength λ1 monitors an optical signal with wavelength λ1 received through the route R2 from node C, the alarm output unit 44a outputs alarm INDWNb_1 (operation St24). That is, since the optical level of the first port 401a becomes −∞ dBm, which is less than the threshold (−30 dBm), the output conditions of INDWNb_1 depicted in FIG. 4 are satisfied.

Next, the alarm detection unit 61 detects alarm IND-WNb_1 and notifies the switch controller 62 of it (operation St25). The switch controller 62 instructs the switch 41a to switch the route of an optical signal with wavelength λ1 in response to this notification (operation St26). More specifically, the switch controller 62 outputs the switching signal SWa to the switch 41a so as to switch the route of an optical signal with wavelength λ1 from the route R2 to the route R1.

Next, the switch 41a in the duplex unit 4a switches the route of an optical signal with wavelength λ1 according to the switching signal SWa (operation St27). More specifically, the switch 41a selects the optical signal from the DEMUX 30a of path #1, from two optical signals input from the DEMUXs 30a and 30b (see arrow K1).

Next, in the monitoring controller is of node A, the alarm detection unit 61 notifies the monitoring controller 1c of node C of alarm INDWNb_1 and switching of the route of an optical signal with wavelength S (route switching event) (operation St28). At this time, the monitoring controller 1c of node C is notified via the interface 60.

Next, the monitoring controller 1c of node C notifies the network management unit 9 of alarm INDWNb_1 and switching of the route of an optical signal with wavelength λ1 (route switching event) (operation St29). The notification is transmitted from the interface 60 to the network management unit 9 via the DCN 90.

Next, the network management unit 9 displays alarm INDWNb_1 and switching of the route of an optical signal with wavelength λ1 (route switching event) on the monitor (operation St30). This notifies the maintenance person that the alarm has been correctly output through remote control using the network management unit 9 and that the route has been switched correctly. Alarm INDWN is tested as described above.

FIG. 11 is a flowchart describing a test procedure of alarm POS. According to the flow in FIG. 11, the test procedure will be described with reference to FIGS. 8 and 9.

When the connection is correct, the network management unit 9 first transmits, to the monitoring controller 1c of node C, a POS issuance command corresponding to an optical signal with wavelength λ2 to be transmitted to the path #2 according to an operation of the maintenance person (operation St31). The POS issuance command is received by the interface 60 of node C via the DCN 90, converted into an appropriate control code, and output to the branching ratio controller 63.

Next, the branching ratio controller 63 changes the branching ratio of splitter 40b in the duplex unit 4b corresponding to wavelength λ2 for each of the output ports 400b to 402b (operation St32). The branching ratio controller 63 controls the branching ratio by outputting control signal SPLb-2 to the splitter 40b, as depicted in FIG. 8. The branching ratio of the first port 402b is changed from 50% to 1% and the branching ratio of the second port 400b is changed from 0% to 49%. The branching ratio of the third port 401b remains at 50%.

Next, in the splitter 40b of node C, the optical levels of the optical signals (output light) with wavelength λ2 of the output ports 400b to 402b are changed (operation St33). For example, the optical level of the first port 402b is changed from 3 dBm to −20 dBm and the optical level of the second port 400b is changed from −∞ dBm to −4 dBm. The optical level of the third port 401b remains at −3 dBm.

As described above, the branching ratio controller 63 reduces the optical level of output light from the first port 402b by reducing the branching ratio of the first port 402b. The branching ratio controller 63 increases the optical level of output light from the second port 400b according to the reduced optical level of output light from the first port 402b by increasing the branching ratio of the second port 400b.

Accordingly, excess light (optical power) generated due to reduction in the optical level of output light from the first port 402b passes through the second port 400b and is terminated by the optical terminator 43b. Therefore, the optical level of output light (optical signal with wavelength of λ2 of another route) from the third port 401b is not affected by changes in the branching ratio and remains at a fixed value. That is, the branching ratio controller 63 controls the branching ratio so that the optical level of output light from the third port 401b is maintained.

Next, as depicted in FIG. 9, at node A on the reception side, since the alarm output unit 45b in the duplex unit 4b corresponding to wavelength λ2 monitors an optical signal with wavelength λ2 received through the route R1 from node C, the alarm output unit 45b outputs alarm POSa_2 (operation St34). That is, since the optical level of the first port 402b becomes −20 dBm, which falls within the range between the lower threshold (−50 dBm) and the upper threshold (−15 dBm), the output conditions of POSa_2 depicted in FIG. 4 are satisfied.

Next, the alarm detection unit 61 detects alarm POSa_2 and notifies the switch controller 62 of it (operation St35). The switch controller 62 instructs the switch 41b to switch the route of an optical signal with wavelength λ2 in response to this notification (operation St36). More specifically, the switch controller 62 outputs the switching signal SWb to the switch 41b so as to switch the route of an optical signal with wavelength λ2 from the route R1 to the route R2.

Next, the switch 41b in the duplex unit 4b switches the route of an optical signal with wavelength λ2 according to the switching signal SWb (operation St37). More specifically, the switch 41b selects the optical signal from the DEMUX 30b of path #2, from two optical signals input from the DEMUXs 30a and 30b (see arrow K2).

Next, in the monitoring controller is of node A, the alarm detection unit 61 notifies the monitoring controller 1c of node C of alarm POSa_2 and switching of the route of an optical signal with wavelength λ2 (route switching event) (operation St38). At this time, the monitoring controller 1c of node C is notified via the interface 60.

Next, the monitoring controller 1*c* of node C notifies the network management unit 9 of alarm POSa_2 and switching of the route of an optical signal with wavelength λ2 (route switching event) (operation St39). The notification is transmitted from the interface 60 to the network management unit 9 via the DCN 90.

Next, the network management unit 9 displays alarm POSa_2 and switching of the route of an optical signal with wavelength λ2 (route switching event) on the monitor (operation St40). This notifies the maintenance person that the alarm has been correctly output through remote control using the network management unit 9 and that the route has been switched correctly. Alarm POS is tested as described above.

The above alarm function tests enables the operation check of the alarm output units 25*a*, 25*b*, 44*a*, 44*b*, 45*a*, and 45*b*. Therefore, if a PD is included in the alarm output units 25*a*, 25*b*, 44*a*, 44*b*, 45*a*, and 45*b*, abnormality of photo acceptance sensitivity due to aged degradation is detected. It is possible to test alarms other than those described above using similar procedures.

The alarm function tests also enables the switching between the routes R1 and R2 of optical signals with wavelengths λ1 and λ2 to be checked. This enables a failure in the switches 41*a* and 41*b* to be detected. At this time, it is possible to confirm that the network management function is normal by displaying an alarm and an occurrence of a route switching event on a monitor of the network management unit 9.

In addition, the alarm function tests enable the detection of errors in optical fiber connections that occurs between components when an optical network is extended, as described below.

Examples for Checking Erroneous Connection of Optical Fibers

Figure 12A:
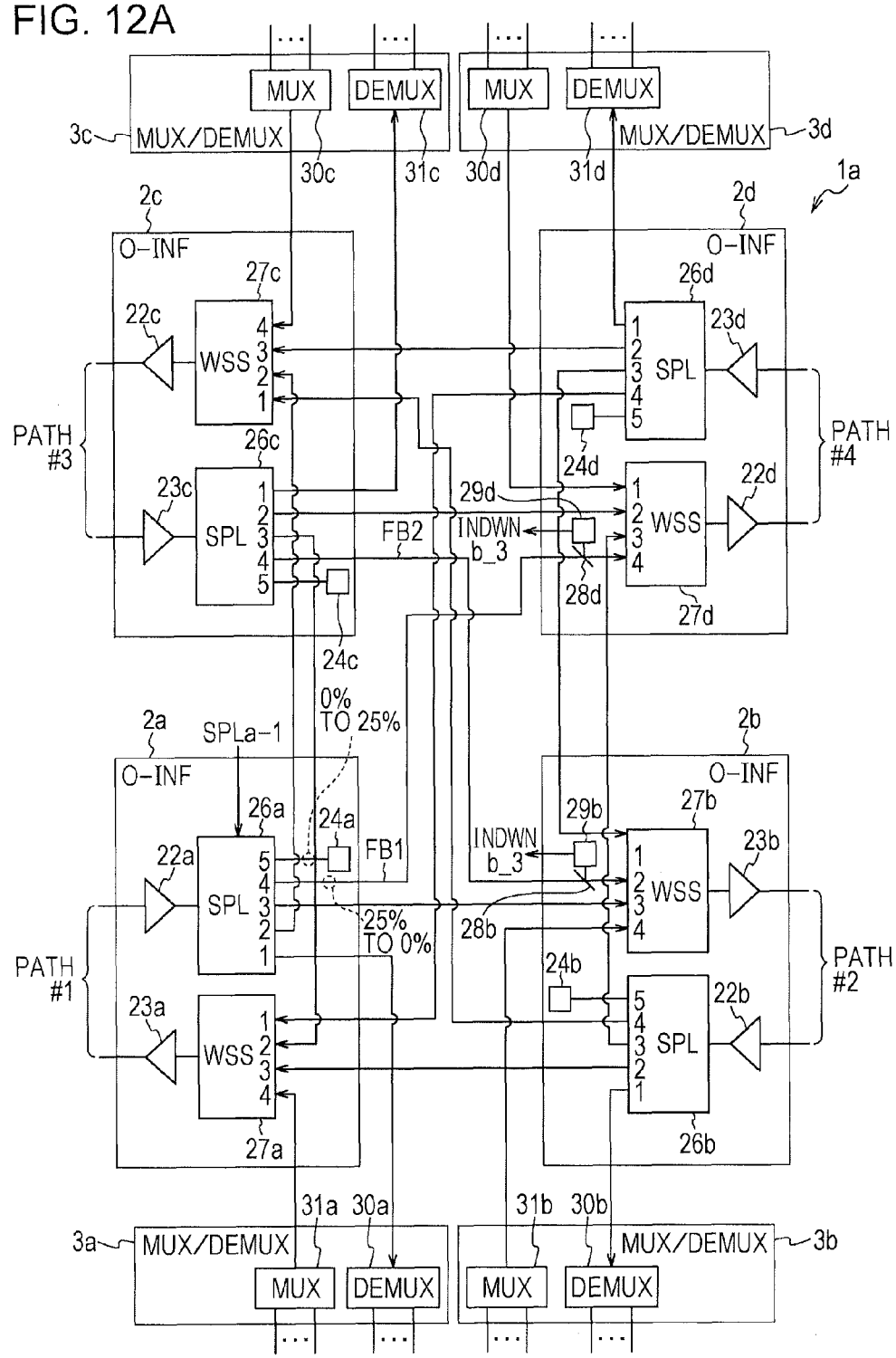
FIG. 12A is a structural diagram (1) depicting an example of the functional structure of the optical transmission device having extended paths.
Figure 12B:
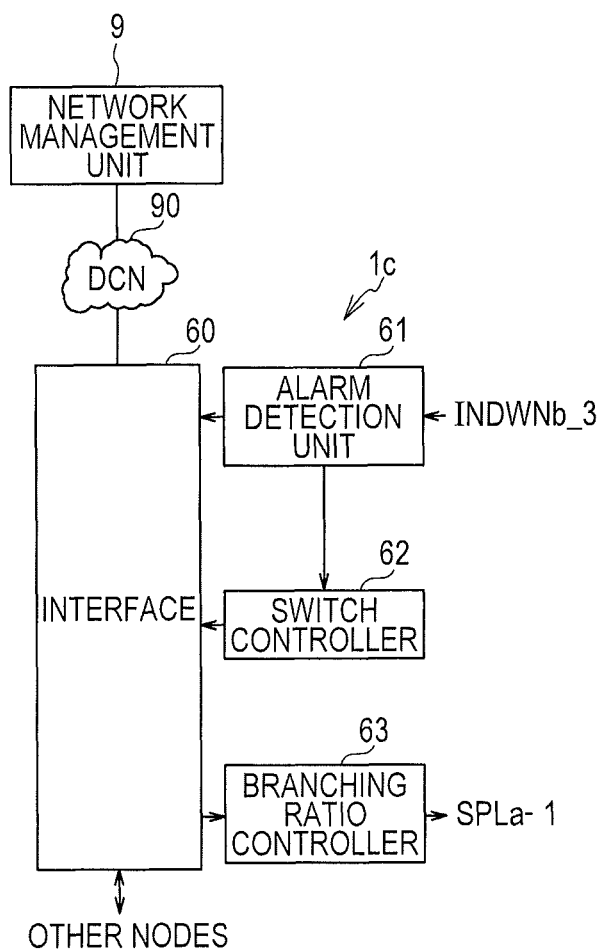
FIG. 12B is a structural diagram (2) depicting an example of the functional structure of the optical transmission device having extended paths.

FIGS. 12A and 12B are structural diagram depicting examples of the functional structure of the optical transmission device having extended paths. More specifically, FIGS. 12A and 12B depict an example of the structure of the core unit is of the ROADM device 1 of node C that has extend paths ROADM when the optical network is extended as depicted in FIG. 2. The components in FIGS. 12A and 12B that are common to those in FIG. 3 are given the same reference numerals and their descriptions are omitted.

The core unit 1*a* includes the O-INFs 2*a* to 2*d* and the MUX/DEMUX units 3*a* to 3*d* that correspond to paths #1 to #4, respectively. Of these components, the O-INFs 2*c* and 2*d* and the MUX/DEMUX units 3*c* to 3*d* are provided in response to addition of paths #3 and #4.

The O-INFs 2*a* to 2*d* include the input amplifiers 22*a* to 22*d*, the output amplifiers 23*a* to 23*d*, splitters 26*a* to 26*d*, wavelength selective switches 27*a* to 27*d*, and the optical terminators 24*a* to 24*d*, respectively. The MUX/DEMUX units 3*c* and 3*d* include the MUXs 31*a* to 31*d* and the DMUXs 30*a* to 30*d*, respectively.

The splitters 26*a* to 26*d* branch input light and output through five output ports (1) to (5) (see numbers 1 to 5), as in the splitters 20*a* and 20*b* in FIG. 3. The output ports (1) of the splitters 26*a* to 26*d* are connected to the DMUXs 30*a* to 30*d* corresponding to the same paths, the output ports (2) to (4) are connected to wavelength selective switches 27*a* to 27*d* of other paths, and the output ports (5) are connected to optical terminators 24*a* to 24*d*, respectively. The branching ratio for the output ports (1) to (5) of the splitters 26*a* to 26*d* is controlled by the branching ratio controller 63 for each of the output ports (1) to (5).

The wavelength selective switches 27*a* to 27*d* multiplex wavelength light selected from wavelength light input through the four input ports (1) to (4) (see numbers 1 to 4) as in the wavelength selective switches 21*a* and 21*b* in FIG. 3, and outputs as an optical multiplexed signal. The input ports (1) of the wavelength selective switches 27*a* to 27*d* are connected to the DMUXs 31*a* to 31*d* corresponding to the same paths and the input ports (2) to (4) are connected to splitters 26*a* to 26*d* of other paths, respectively.

In this example, the optical fibers FB1 and FB2 in FIG. 12A are erroneously connected. The optical fiber FB1 interconnects the output port (4) the splitter 26*a* of path #1 and the input port (4) of the wavelength selective switch 27*d* of path #4. The optical fiber FB2 interconnects the output port (4) the splitter 26*c* of path #3 and the input port (2) the wavelength selective switch 27*b* of path #2. The connectors of the optical fiber FB1 and FB2 are disposed at the ends of the interfaces 2*a* and 2*d*.

The O-INF 2*b* of path #2 has an alarm output unit 29*b* that monitors an optical multiplexed signal input to the input port (2) of the wavelength selective switch 27*b* via the optical fiber FB2. The optical signal to be monitored is input to the O-INF 2*b* from the optical fiber FB2, branched by the optical splitter 28*b*, and then input to the input port (2) of the wavelength selective switch 27*b* and the alarm output unit 29*b*.

The alarm output unit 29*b* monitors the optical level of output light from the output port (4) of the splitter 26*c* of path #3 and outputs alarm INDWNb_3 according to the optical level. The output condition of alarm INDWNb_3 is depicted in FIG. 4. That is, alarm INDWNb_3 indicates that the optical multiplexed signal from the output port (4) of the splitter 26*c* has been interrupted.

On the other hand, the O-INF 2*d* of path #4 has an alarm output unit 29*d* that monitors an optical multiplexed signal input to the input port (4) of the wavelength selective switch 27*d* via the optical fiber FB1. The optical signal to be monitored is input to the O-INF 2*d* from the optical fiber FB1, branched by the optical splitter 28*d*, and then input to the input port (4) of the wavelength selective switch 27*d* and the alarm output unit 29*d*.

The alarm output unit 29*d* monitors the optical level of output light from the output port (4) of the splitter 26*a* of path #1 and outputs alarm INDWNd_3 according to the optical level. The output condition of alarm INDWNd_3 is depicted in FIG. 4. That is, alarm INDWNd_3 indicates that the optical multiplexed signal from the output port (4) of the splitter 26*a* has been interrupted.

Accordingly, alarm INDWNd_3 is output when the branching ratio of the output port (4) the splitter 26*a* of path #1 is reduced from 25% to 0% by control signal SPLa-1 of a branching ratio controller 31 and the branching ratio of the output port (5) is increased from 0% to 25%. That is, when the optical fibers FB1 and FB2 are connected correctly, alarm INDWNd_3 is detected by the alarm detection unit 61 through the control of the branching ratio described above.

Figure 13A:
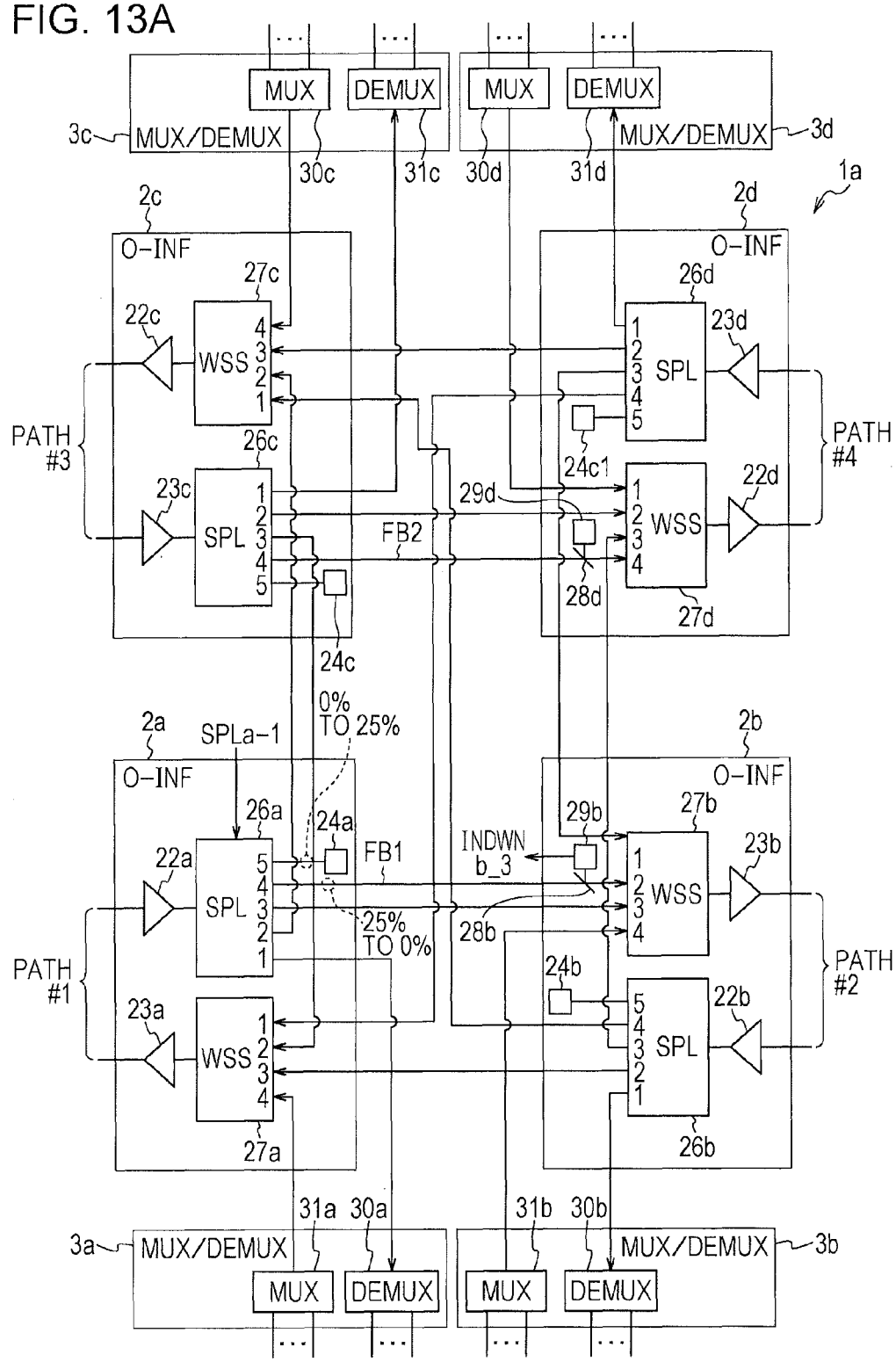
FIG. 13A is a structural diagram (1) depicting an example of erroneous connection of optical fibers in the optical transmission device depicted in FIGS. 12A and 12B.
Figure 13B:
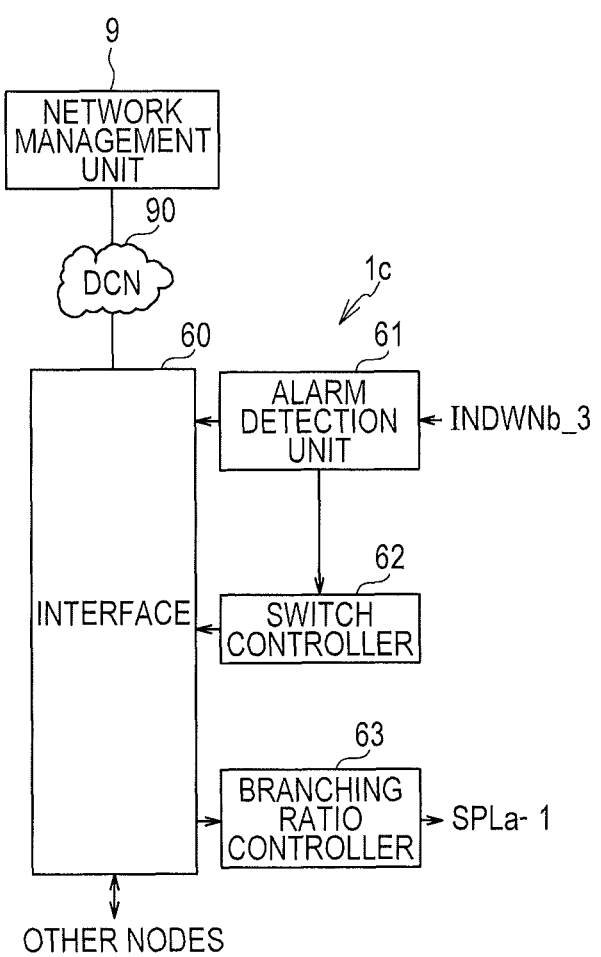
FIG. 13B is a structural diagram (2) depicting an example of erroneous connection of optical fibers in the optical transmission device depicted in FIGS. 12A and 12B.

On the other hand, FIGS. 13A and 13B are structural diagrams depicting examples of erroneous connection of optical fibers in the optical transmission device depicted in FIGS. 12A and 12B. More specifically, FIG. 13A depicted an example in which the connection destinations of the optical fibers FB1 and FB2 in the ROADM device 1 depicted in FIG. 12A are exchanged.

The optical fiber FB1 interconnects the output port (4) the splitter 26*a* of path #1 and the input port (2) the wavelength selective switch 27*b* of path #2. The optical fiber FB2 interconnects the output port (4) the splitter 26c of path #3 and the input port (4) of the wavelength selective switch 27d of path #4.

In this connection configuration, alarm INDWNb_3 is output when, for example, the branching ratio of the output port (4) of the splitter 26a of path #1 is reduced from 25% to 0% by control signal SPLa-1 of the branching ratio controller 31 and the branching ratio of the output port (5) is increased from 0% to 25%. That is, when the optical fibers FB1 and FB2 are connected erroneously, alarm INDWNb_3 is detected by the alarm detection unit 61 through the control of the branching ratio described above. Accordingly, the connections of the optical fibers FB1 and FB2 are checked based on the detected alarm.

Figure 14:
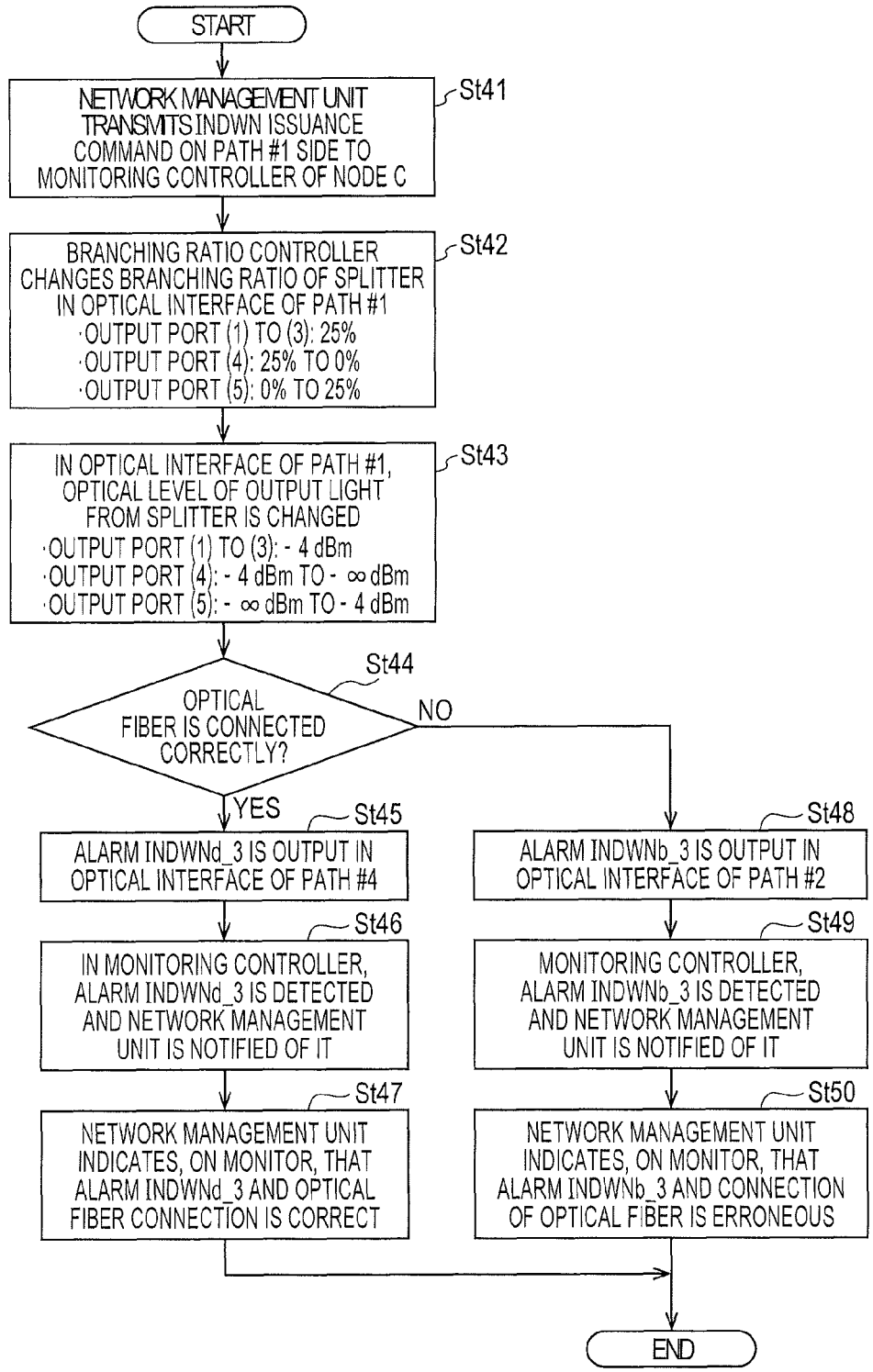
FIG. 14 is a flowchart describing a test procedure for checking erroneous connection of optical fibers.

FIG. 14 is a flowchart describing a test procedure for checking erroneous connection of optical fibers. According to the flow in FIG. 14, the test procedure will be described with reference to FIGS. 12A, 12B, 13A, and 13B.

First, the network management unit 9 transmits, to the monitoring controller is of node C, a INDWN issuance command on the path #1 side according to an operation of the maintenance person (operation St41). At this time, the network management unit 9 stores alarm INDWNd_3 in a storage device such as a hard disk drive as an expected alarm that is expected to be detected when the optical fibers FB1 and FB2 are connected correctly. The INDWN issuance command is received by the interface 60 of node C via DCN 90, converted into an appropriate control code, and output to the branching ratio controller 63.

Next, the branching ratio controller 63 changes the branching ratio of the splitter 26a in the O-INF 2a of path #1 for each of the output ports (1) to (5) (operation St42). The branching ratio controller 63 controls the branching ratio by outputting control signal SPLa-1 to the splitter 26a. The branching ratio of the output port (4) is changed from 25% to 0% and the branching ratio of the output port (5) is changed from 0% to 25%. The branching ratios of the other output ports (1) to (3) remain at 25%.

Next, in the O-INF 2a of path #1, the optical levels of the optical multiplexed signals (output light) of the output ports (1) to (5) of the splitter 26a are changed (operation St43). For example, the optical level of the output port (4) is changed from –4 dBm to –∞ dBm and the optical level of the output port (5) is changed from –∞ dBm to –4 dBm. The optical levels of the output ports (1) to (3) remain at –4 dBm.

As described above, the branching ratio controller 63 reduces the optical level of output light from the output port (4) by reducing the branching ratio of the output port (4). The branching ratio controller 63 increases the optical level of output light from the output port (5) according to the reduced optical level of output light from the output port (4) by increasing the branching ratio of the output port (5).

Accordingly, excess light (optical power) generated due to reduction in the optical level of output light from the output port (4) passes through the output port (5) and is terminated by the optical terminator 24a. Therefore, even when the optical signal of a line being used is output from the other output ports (1) to (3), the optical level of output light from other output ports (1) to (3) is not affected by changes in the branching ratio, remains at a fixed value, and the line being used is not affected. That is, the branching ratio controller 63 controls the branching ratio so that the optical level of output light from the other output ports (1) to (3) is maintained.

Next, when the optical fibers FB1 and FB2 are connected correctly (YES in operation St44), operation St45 and subsequent operations are performed. When the optical fibers FB1 and FB2 are connected erroneously (NO in operation St44), operation St48 and subsequent operations are performed.

When the optical fibers FB1 and FB2 are connected correctly (YES in operation St44), the alarm output unit 29d outputs alarm INDWNd_3 in the O-INF 2d of path #4, as depicted in FIG. 12A (operation St45). That is, since the optical level of the port (4) of the splitter 26a becomes –∞ dBm, which is less than the threshold (–50 dBm), the output conditions of INDWNd_3 depicted in FIG. 4 are satisfied.

Next, in the monitoring controller 1c, the alarm detection unit 61 detects alarm INDWNd_3 and notifies the network management unit 9 of it (operation St46). At this time, the alarm detection unit 61 transmits alarm INDWNd_3 input from the alarm output unit 29d, to the network management unit 9 via the interface 60 and the DCN 90.

Next, the network management unit 9 indicates, on the monitor, alarm INDWNd_3 and that the connections of the optical fibers FB1 and FB2 are correct (operation St47). At this time, the network management unit 9 indicates the fact by confirming that alarm INDWNd_3 matches the above expected alarm. This allows the maintenance person to confirm that the connections of the optical fibers FB1 and FB2 are correct.

When the optical fibers FB1 and FB2 are connected erroneously (NO in operation St44), the alarm output unit 29d outputs alarm INDWNb_3 in the O-INF 2b of path #2, as depicted in FIG. 13A (operation St48). That is, since the optical level of the port (4) of the splitter 26a becomes –∞ dBm, which is less than the threshold (–50 dBm), the output conditions of INDWNb_3 depicted in FIG. 4 are satisfied.

Next, in the monitoring controller 1c, the alarm detection unit 61 detects alarm INDWNb_3 and notifies the network management unit 9 of it (operation St49). At this time, the alarm detection unit 61 transmits alarm INDWNb_3 input from the alarm output unit 29b, to the network management unit 9 via the interface 60 and the DCN 90.

Next, the network management unit 9 indicates, on the monitor, alarm INDWNb_3 and that the connections of the optical fibers FB1 and FB2 are erroneous (operation St46). At this time, the network management unit 9 indicates the fact by confirming that alarm INDWNb_3 does not match the above expected alarm. This allows the maintenance person to confirm, through remote control, that the connections of the optical fibers FB1 and FB2 are erroneous using the network management unit 9. As described above, erroneous connections of optical fibers are checked.

Figure 15:
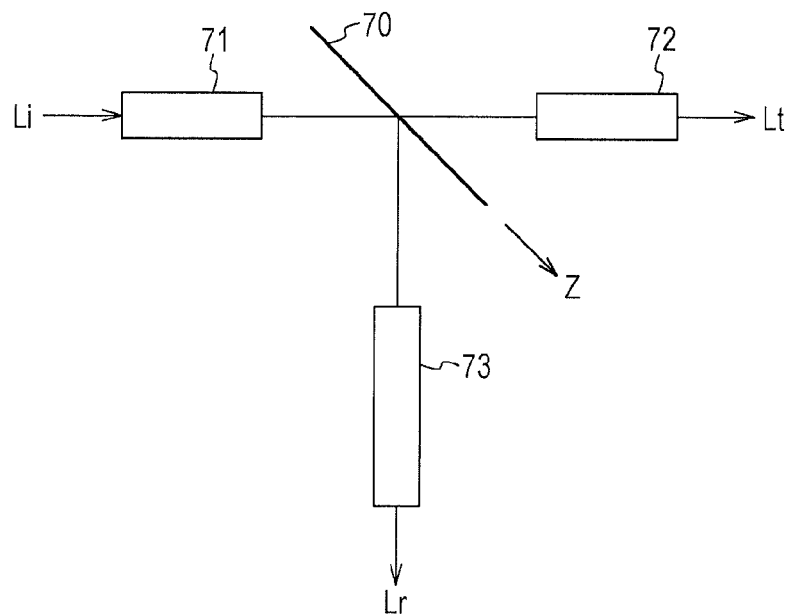
FIG. 15 is a structural diagram depicting an example of the functional structure of an optical splitter with a variable branching ratio.

Next, an example of the structure of the splitters 20a, 20b, 40a, 40b, and 26a to 26d will be described. FIG. 15 is a structural diagram depicting an example of the functional structure of an optical splitter with a variable branching ratio. In the following description, an optical splitter with a variable branching ratio is referred to as a variable optical splitter to separate it from general optical splitters.

The variable optical splitter includes an optical thin film 70 and collimators 71 to 73. The collimator 71 forms parallel light from incident light Li and guides the parallel light to the optical thin film 70. The optical thin film 70 transmits the incident light Li and guides it to the collimator 71. In addition, the optical thin film 70 reflects the incident light Li and guides it to the collimator 73. The collimator 71 forms parallel light from the transmitted incident light Li and outputs the parallel light as transmitted light Lt. The collimator 73 form parallel light from the reflected incident light Li and outputs the parallel light as reflected light Lr.

Figure 16:
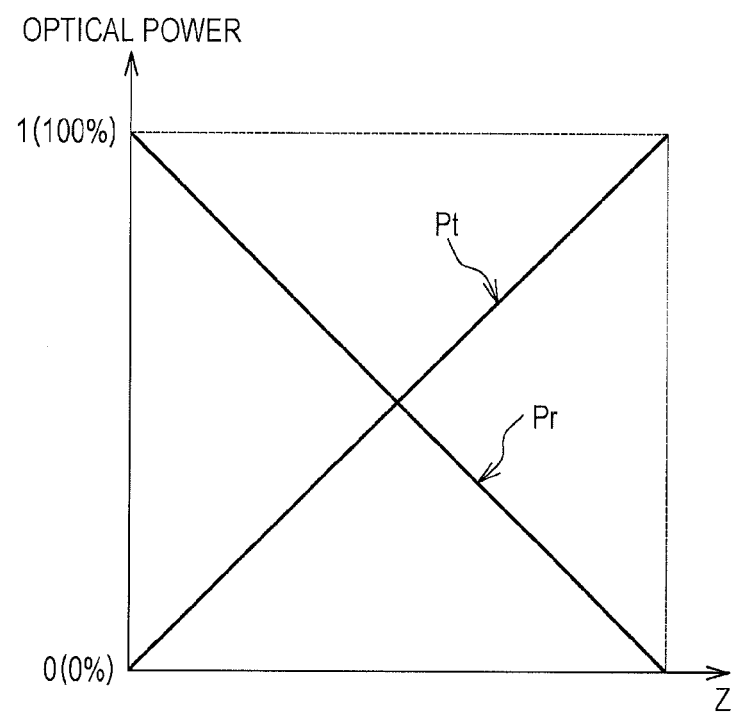
FIG. 16 is a graph depicting changes in the power of transmitted light and reflected light with respect to changes in the position of optical thin film.

For the optical thin film 70, the position in the Z-direction is variable. The transmission factor and reflection factor vary depending on the incident position with respect to the incident light Li. FIG. 16 is a graph depicting changes in the power Pt of the transmitted light Lt and the power Pr of reflected light Lr with respect to changes in the position of the optical thin film 70. As depicted in the FIG. 16, the power Pt of the transmitted light Lt and the power Pr of reflected light Lr change linearly within the range from 0 to 100% with respect to the position (Z) of the optical thin film 70. In addition, power Pt and power Pr change in inverse proportion to each other. The sum of power Pt and power Pr is 100%. Accordingly, it is possible to use transmitted light Lt and reflected light Lr as the branched output light of the 1×2 port variable optical splitter.

Figure 17:
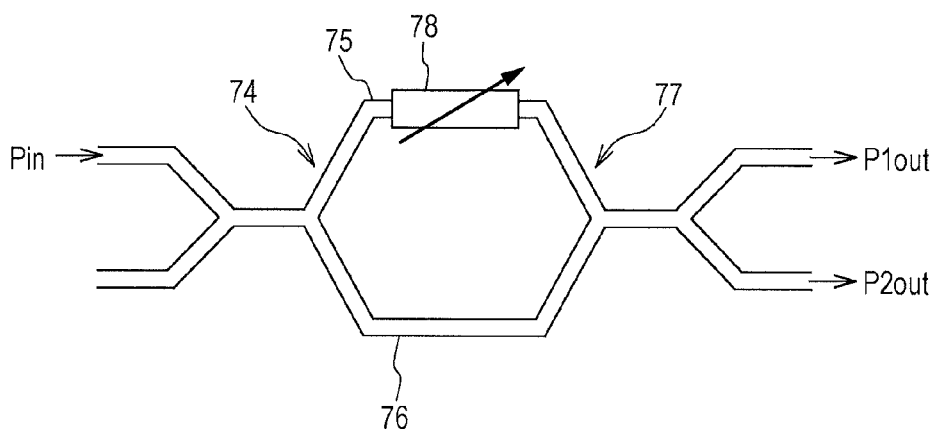
FIG. 17 is a structural diagram depicting another example of the functional structure of the optical splitter with a variable branching ratio.

The variable optical splitter may be configured using a Mach-Zehnder interferometer. FIG. 17 is a structural diagram depicting the functional structure of the variable optical splitter in this case.

The variable optical splitter includes a 2-way (with a branching ratio of 1 to 1) optical couplers 74 and 77, a pair of arms 75 and 76, and a heater 78. The optical couplers 74 and 77 form a waveguide in which their branched ends are combined with each other. The arms 75 and 76 are disposed on the waveguide and the heater 78 is disposed in the arm 75. The heater 78 heats the arm 75 according to external control.

In this example, the state of interference with light in the other arm 76 is changed by changing the phase of light in the arm 75 through the control of the heat value of the heater 78. This also changes the power P1out and power P2out of output light.

Figure 18:
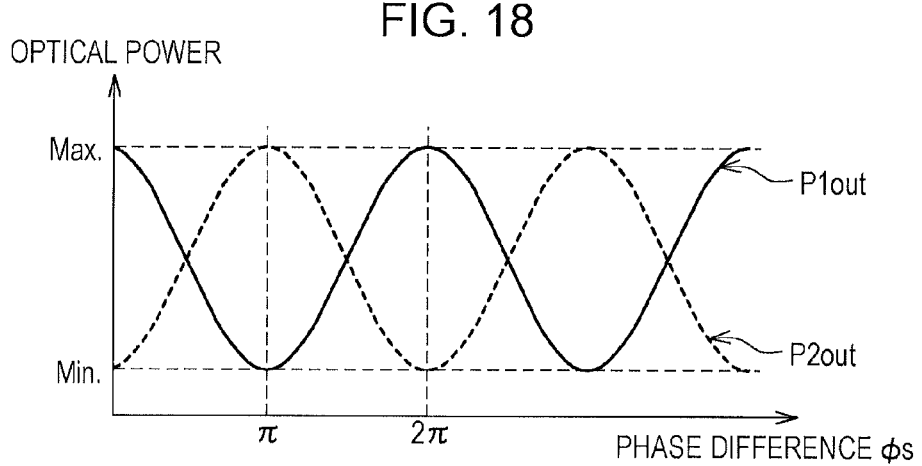
FIG. 18 is a graph depicting changes in the power of output light with respect to changes in the phase of input light.

FIG. 18 is a graph depicting changes in the power P1out and P2out of output light with respect to changes in the phase difference ($\phi$s) of input light. The power P1out and P2out are represented by the following expressions (1) and (2), respectively, when the power of input light is Pin. Constant $\alpha$ is a coupling coefficient.

$$P1\text{out}=P\text{in}(1+\alpha \cos \phi s)/2 \quad (1)$$

$$P2\text{out}=P\text{in}(1+\alpha \sin \phi s)/2 \quad (2)$$

Accordingly, it is possible to use light with power P1out and light with power P2out as the branched output light of the 1×2 port variable optical splitter.

Figure 19:
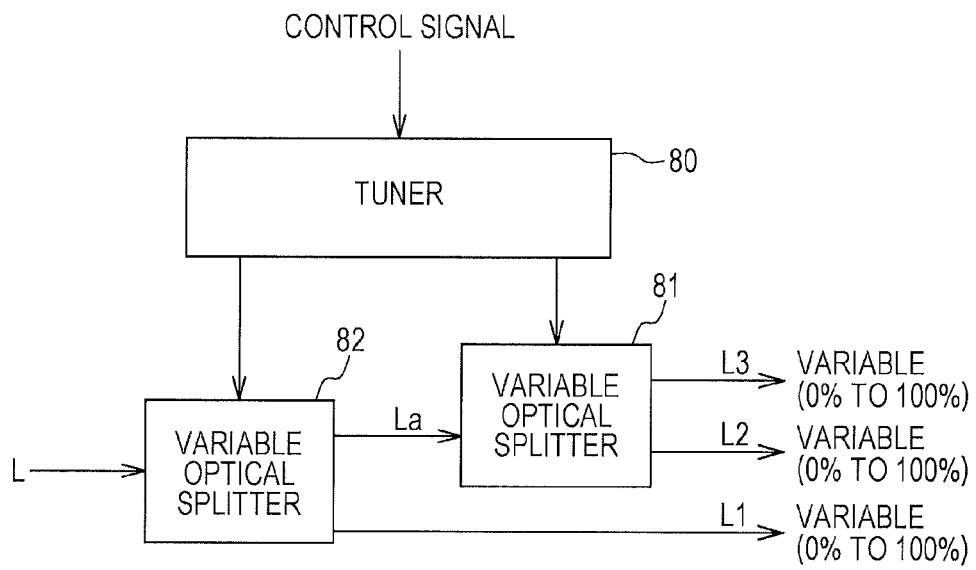
FIG. 19 is a structural diagram depicting an example of the structure of a splitter.

The 1×3 port splitters 20a, 20b, 40a, and 40b as described below are configured by using the 1×2 port variable optical splitter described above. FIG. 19 is a structural diagram depicting an example of the structure of the splitters 20a, 20b, 40a, and 40b.

The splitters 20a, 20b, 40a, and 40b each have a tuner 80 and two variable optical splitters 81 and 82. The variable optical splitters 81 and 82 have a structure depicted in FIG. 15 or 17, for example.

The tuner 80 adjusts the power of output light L1 to L3 and output light La of the variable optical splitters 81 and 82 according to the control signals SPLa-1, SPLb-1, SPLa-2, and SPLb-2 of the branch ratio controller 31. For example, when the variable optical splitters 81 and 82 have the structure depicted in FIG. 15, the tuner 80 adjusts the position of the optical thin film 70 in the Z-direction. When the variable optical splitters 81 and 82 have the structure depicted in FIG. 17, the tuner 80 adjusts the heat value of the heater 78.

The variable optical splitter 82 outputs optical light La and optical light L1 by branching input light L. The other output light La is input to the other variable optical splitter 81 and branched and the other output light L1 is output externally. Accordingly, the power of optical light L1 to L3 becomes variable within the range from 0% to 100%. The power of optical light L1 to L3 is adjusted so that the sum becomes 100%.

Figure 20:
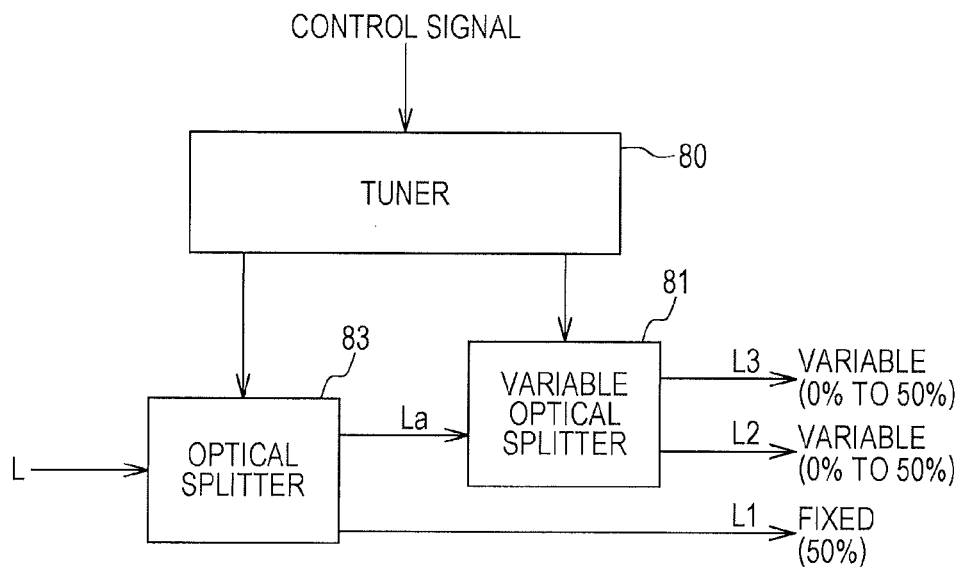
FIG. 20 is a structural diagram depicting another example of the structure of a splitter.

In the example in FIG. 19, the branching ratios of all ports of the splitters 20a, 20b, 40a, and 40b are variable, but some of them may be fixed. FIG. 20 is a structural diagram depicting another example of the structure of the splitters 20a, 20b, 40a, and 40b. The components in FIG. 20 that are common to those in FIG. 19 are given the same reference numerals and their descriptions are omitted.

The splitters 20a, 20b, 40a, and 40b each have the tuner 80, the variable optical splitter 81, and an optical splitter 83. The tuner 80 adjusts the power of the output light L2 and the output light L3 of the optical splitter 81 according to the power of the control signals SPLa-1, SPLb-1, SPLa-2, and SPLb-2 of the branch ratio controller 31.

The optical splitter 83 has 1×2 ports and the two output ports has a fixed branching ratio of 1 to 1. The optical splitter 83 outputs output light La and output light L1 by branching the input light L. The other output light La is input to the other variable optical splitter 81 and branched and the other output light L1 is output externally. Accordingly, the power of the output light L2 and the output light L3 becomes variable within the range from 0% to 50% and the power of the output light L1 is fixed to 50%. The power of the optical light L2 and the optical light L3 is adjusted so that the sum of the output light L1 to L3 becomes 100%.

The structure of this example has a lower cost than in the example of the structure in FIG. 19 because this example uses the normal optical splitter 83 with a fixed branching ratio. The 1×5 port splitters 26a to 26d or another splitter with a different number of ports is configured by combining a plurality of variable optical splitters or combining a plurality of variable optical splitters and optical splitters.

The splitters 20a, 20b, 40a, 40b, and 26a to 26d are not limited to variable optical splitters and they may include a wavelength selective switch and a plurality of variable optical attenuators (VOA). When using variable optical attenuators, the optical level is controlled by adjusting the amount of attenuation of a variable optical attenuator provided for each of output ports of the optical splitter.

As described above, the optical transmission device 1 according to the embodiment has the splitters 20a, 20b, 40a, and 40b and the branching ratio controller 63. The splitters 20a, 20b, 40a, and 40b have at least the first ports 202a, 202b, 401a, and 402b and the second ports 200a, 200b, 400a, and 400b, and third ports 201a, 201b, 402a, and 401b. The branching ratio controller 63 reduces the optical level of output light from the first ports 202a, 202b, 401a, and 402b by controlling the branching ratio and increases the optical level of output light from the second ports 200a, 200b, 400a, and 400b according to the reduced optical level.

In the optical transmission device 1 according to the embodiment, the branching ratio controller 63 controls the branching ratio so as to reduce the optical level of output light from the first ports 202a, 202b, 401a, and 402b to be monitored. Accordingly, it is possible to output an alarm about the optical level through remote control.

In addition, the branching ratio controller 63 controls the branching ratio so as to increase the optical level of output light from the second ports 200a, 200b, 400a, and 400b according to the reduced optical level of output light from the first ports 202a, 202b, 401a, and 402b. Accordingly, the excess light (optical power) generated due to reduction in the optical level of output light from the first ports 202a, 202b, 401a, and 402b is output to the second ports 200a, 200b, 400a, and 400b. Therefore, even when an optical signal on a line being used is output from the third port 201a, 201b, 402a, and 401b, the optical level of output light from the third port 201a, 201b, 402a, and 401b is not affected by changes in the branching ratio and remains at a fixed value. Accordingly, the optical transmission device 1 according to the embodiment is able to output an alarm through remote control during operation.

In addition, the optical transmission system according to the embodiment includes a first optical transmission device 1 and a second optical transmission system 1 that are connected to each other via a transmission path. The first optical transmission device 1 includes the splitters 40a and 40b and the branching ratio controller 63. The splitters 40a and 40b include at least the first ports 401a and 402b, the second ports 400a and 400b, and the third ports 402a and 401b, respectively, from which the branched input light is output. The branching ratio controller 63 reduces the optical level of output light from the first ports 401a and 402b to be monitored by controlling the branching ratio and increases the optical level of output light from the second ports 400a and 400b according to the reduced optical level.

The second optical transmission system 1 has alarm output units 44a, 44b, 45a, and 45b that monitor the optical level of output light from the first ports 401a and 402b of the first optical transmission device 1 transmitted via a transmission path, and outputs an alarm according to the optical level.

The optical transmission system according to the embodiment has effects similar to those described above because the optical transmission system has the structure similar to that of the optical transmission device 1 according to the embodiment.

The test method for the alarm function according to the embodiment reduces the optical level of output light from the first ports 202a, 202b, 401a, and 402b and increases the optical level of output light from the second ports 200a, 200b, 400a, and 400b according to the reduced optical level by controlling the branching ratios of the first ports 202a, 202b, 401a, and 402b and the second ports 200a, 200b, 400a, and 400b of the splitters 20a, 20b, 40a, and 40b including at least the first ports 202a, 202b, 401a, and 402b, the second ports 200a, 200b, 400a, and 400b, and the third ports 201a, 201b, 402a, and 401b that output the branched input light.

The test method for the alarm function according to the embodiment has effects similar to those described above because the test method has the structure similar to that of the optical transmission device 1 according to the embodiment.

The present disclosure has been described specifically above with reference to preferred embodiments, but it is clear that those skilled in the art would be able to make various modifications based on the basic technical concept and teaching of the disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission system comprising:
a first optical transmission device configured to include
a splitter that has at least a first port, a second port, and a third port that outputs branched input light, branching ratios of the first port and the second port being variable, and
a controller including a processor that reduces an optical level of output light from the first port of the splitter to be monitored so that an alarm for testing of an alarm function is detected at a fourth port coupled to the first port of the splitter via a transmission path and increases an optical level of output light from the second port according to the reduced optical level of output light from the first port of the splitter so as to maintain the optical level of output light from the third port by controlling the branching ratios; and
a second optical transmission device coupled to the first optical transmission device via a transmission path, the second optical transmission device including
a photo detector that monitors the optical level of output light from the first port and generates an alarm according to the optical level of output light from the first port,
wherein the second optical transmission device further includes a switch that selects one of output light from the first port of the first optical transmission device and output light from another optical transmission device, the switch selecting the output light from the other optical transmission device when the photo detector issues the alarm.

* * * * *